(12) United States Patent
Uchiyama et al.

(10) Patent No.: US 7,886,597 B2
(45) Date of Patent: *Feb. 15, 2011

(54) DYNAMIC AMOUNT SENSOR

(75) Inventors: Takeshi Uchiyama, Chiba (JP); Mitsuo Yarita, Chiba (JP); Akira Egawa, Chiba (JP)

(73) Assignee: Seiko Instruments Inc. (JP)

( * ) Notice: Subject to any disclaimer, the term of this patent is extended or adjusted under 35 U.S.C. 154(b) by 430 days.

This patent is subject to a terminal disclaimer.

(21) Appl. No.: 11/703,017

(22) Filed: Feb. 6, 2007

(65) Prior Publication Data

US 2007/0240509 A1    Oct. 18, 2007

(30) Foreign Application Priority Data

Feb. 14, 2006  (JP) .............................. 2006-037043
Dec. 28, 2006  (JP) .............................. 2006-355666

(51) Int. Cl.
*G01P 9/04*   (2006.01)
*G01P 15/125*   (2006.01)

(52) U.S. Cl. ................................ 73/504.12; 73/514.32
(58) Field of Classification Search .............. 73/504.12, 73/514.32; 361/280
See application file for complete search history.

(56) References Cited

U.S. PATENT DOCUMENTS 5,313,835 A * 5/1994 Dunn ....................... 73/514.15
5,383,364 A * 1/1995 Takahashi et al. ......... 73/514.32
6,952,966 B2  10/2005 Itakura .................... 73/514.32
7,444,870 B2 * 11/2008 Uchiyama et al. ......... 73/504.12

FOREIGN PATENT DOCUMENTS

JP    2004279261    10/2004

* cited by examiner

*Primary Examiner*—John E Chapman
(74) *Attorney, Agent, or Firm*—Adams & Wilks

(57) ABSTRACT

A dynamic amount sensor has a detecting circuit that detects a change in an electrostatic capacitance of each of electrostatic capacitance elements comprised of a movable electrode and a fixed electrode. A switching circuit switches the detecting circuit to first and second connecting states that detect changes in the electrostatic capacitance of the electrostatic capacitance elements in accordance with a change in an attitude of the movable electrode in corresponding first and second detecting axes directions. In the first and second connecting states, the detecting circuit includes circuits formed by connecting the electrostatic capacitance elements in series which change electrostatic capacitances symmetrically along with inclination of the movable electrode in the corresponding first and second detecting axes directions. A carrier wave applying circuit applies carrier waves whose phases are inverted from each other by 180° to the electrostatic capacitance elements which are connected in series in the first and second connecting states of the detecting circuit.

18 Claims, 21 Drawing Sheets

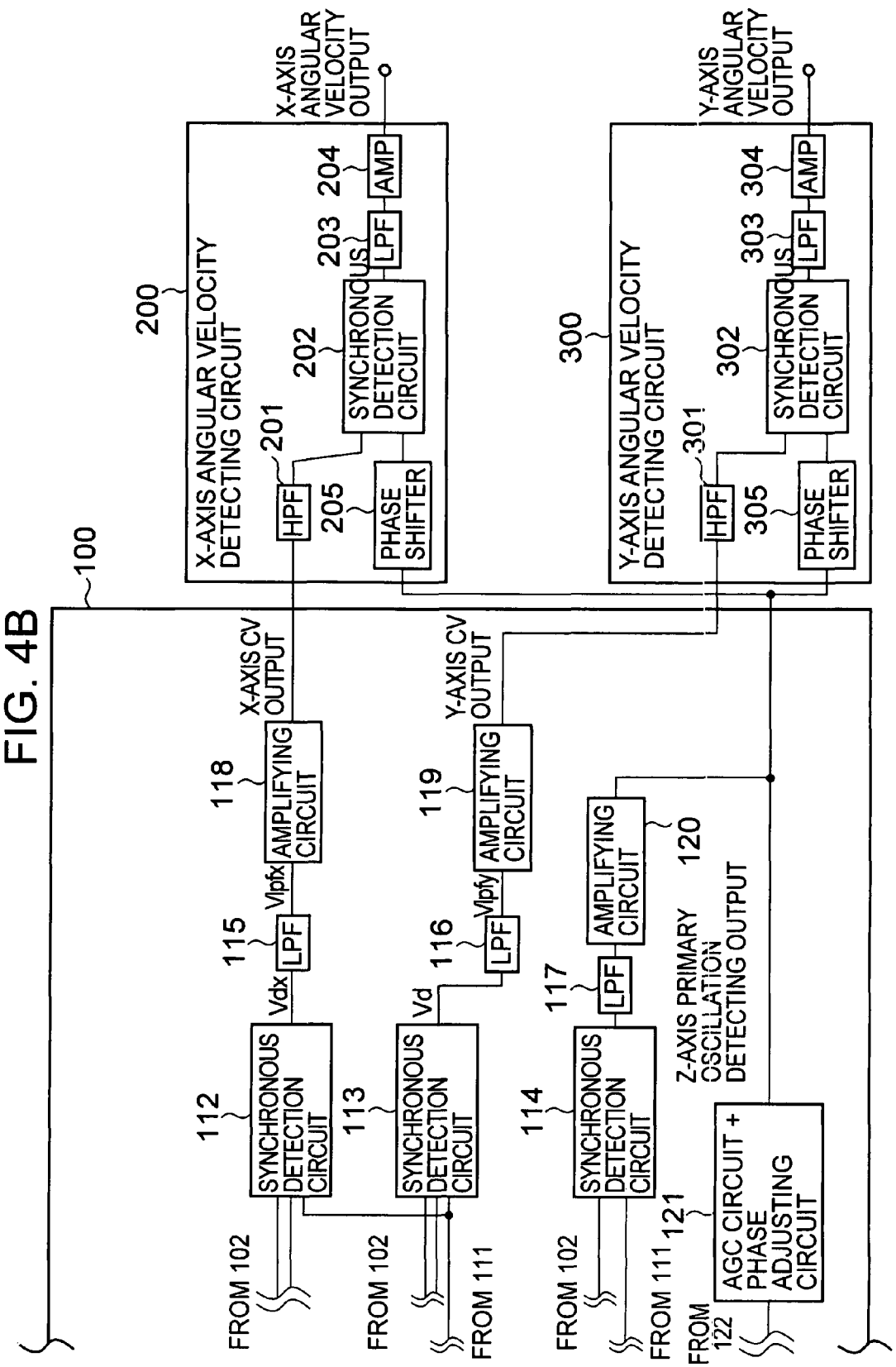

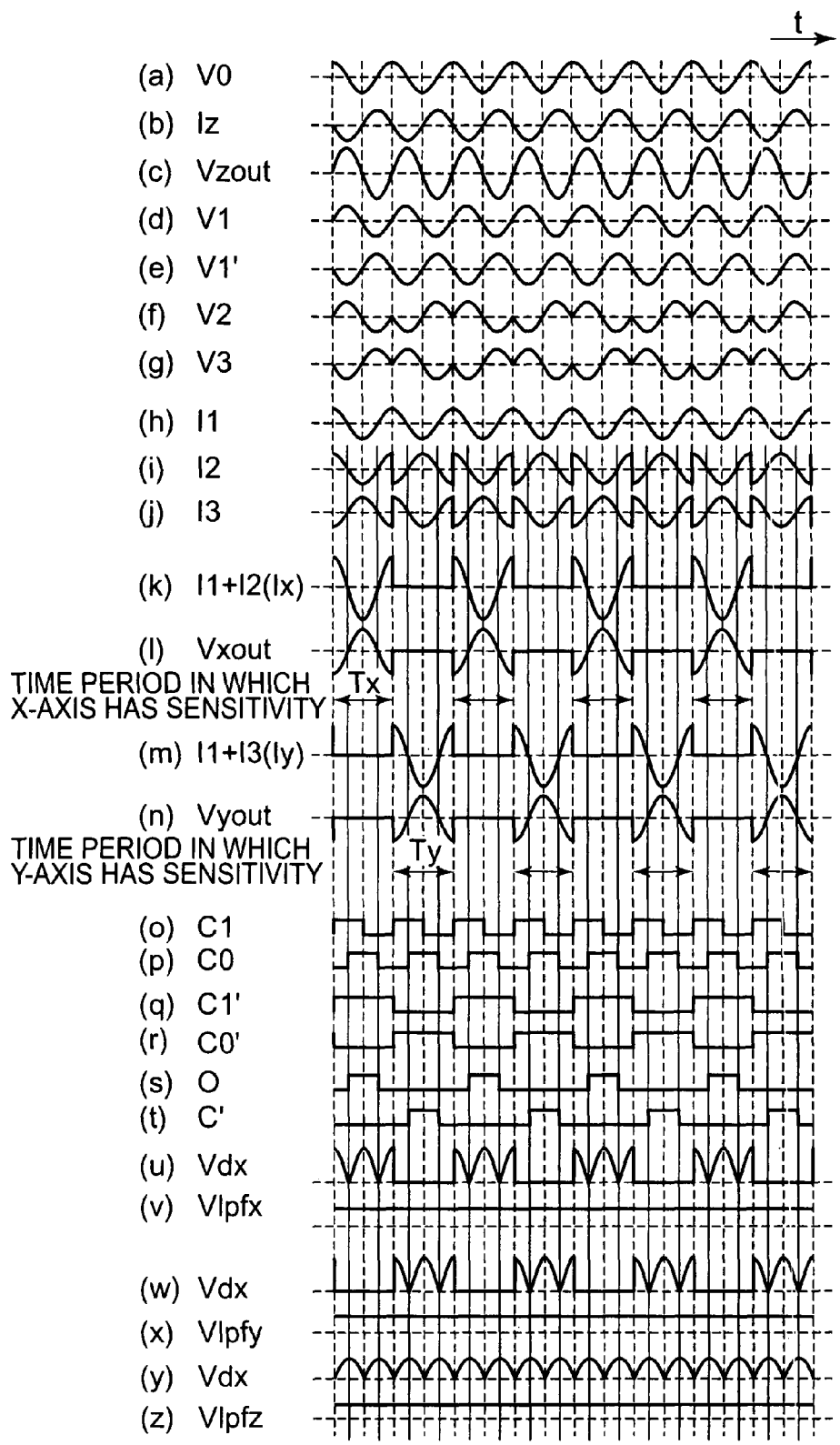

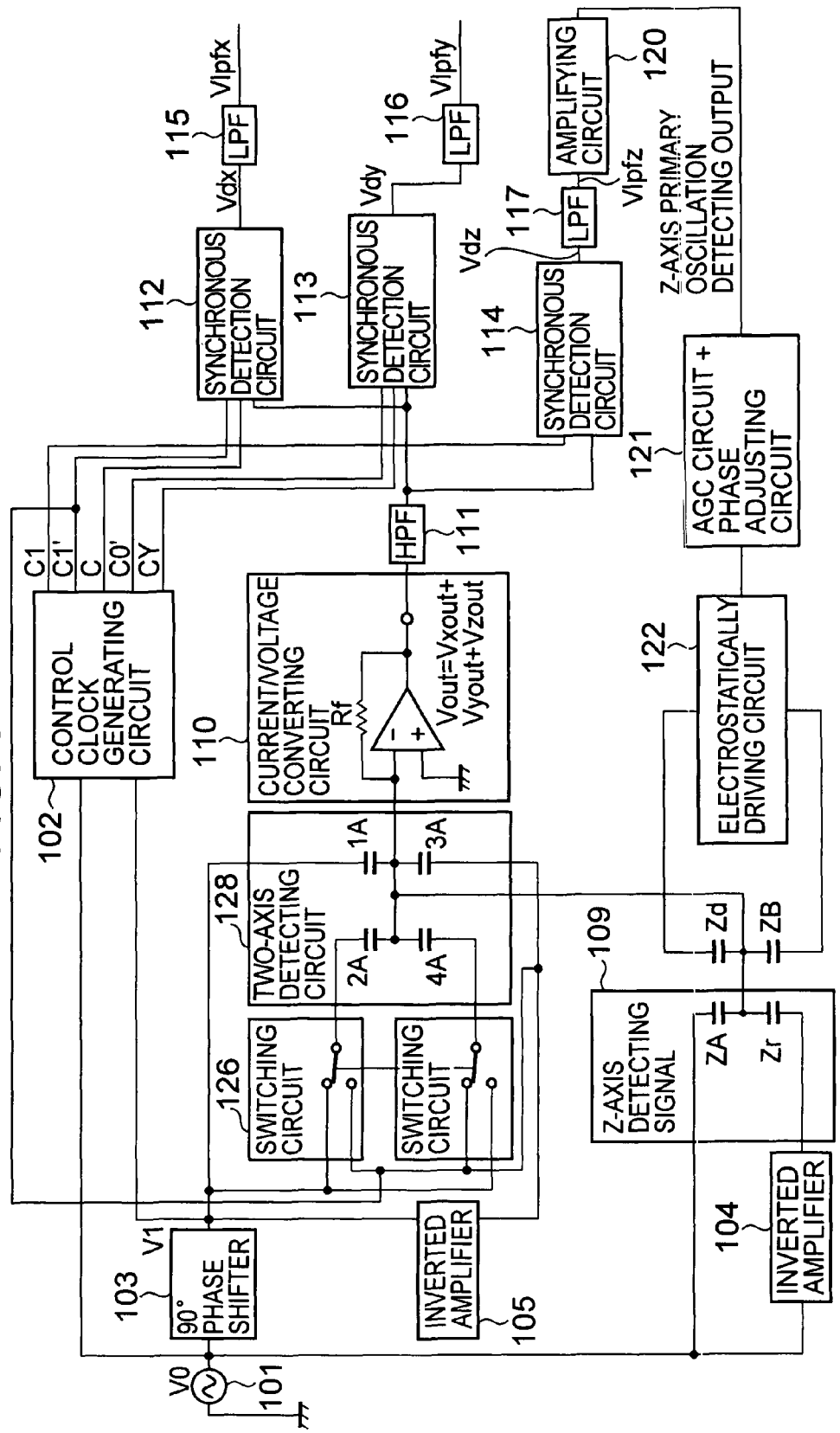

FIG. 10

| SWITCHING CIRCUIT NO | TERMINAL CONDUCTED TO SWITCHING CIRCUIT TERMINAL 1 | | |
|---|---|---|---|
| | IN DETECTING X | IN DETECTING Y | IN DETECTING Z |
| SWITCHING CIRCUIT a | 2 | 3 | 2 |
| SWITCHING CIRCUIT b | 3 | 2 | 2 |
| SWITCHING CIRCUIT c | 3 | 3 | 2 |
| SWITCHING CIRCUIT d | 3 | 3 | 2 |

(19) C1
(20) C0
(21) C2A
(22) C3A
(23) C4A,C5A
(24) CX
(25) CY
(26) CZ
(27) CX'
(28) CY'
(29) CZ'
(30) Vdx
(31) Vlpfx
(32) Vdy
(33) Vlpfy
(34) Vdz
(35) Vlpfz

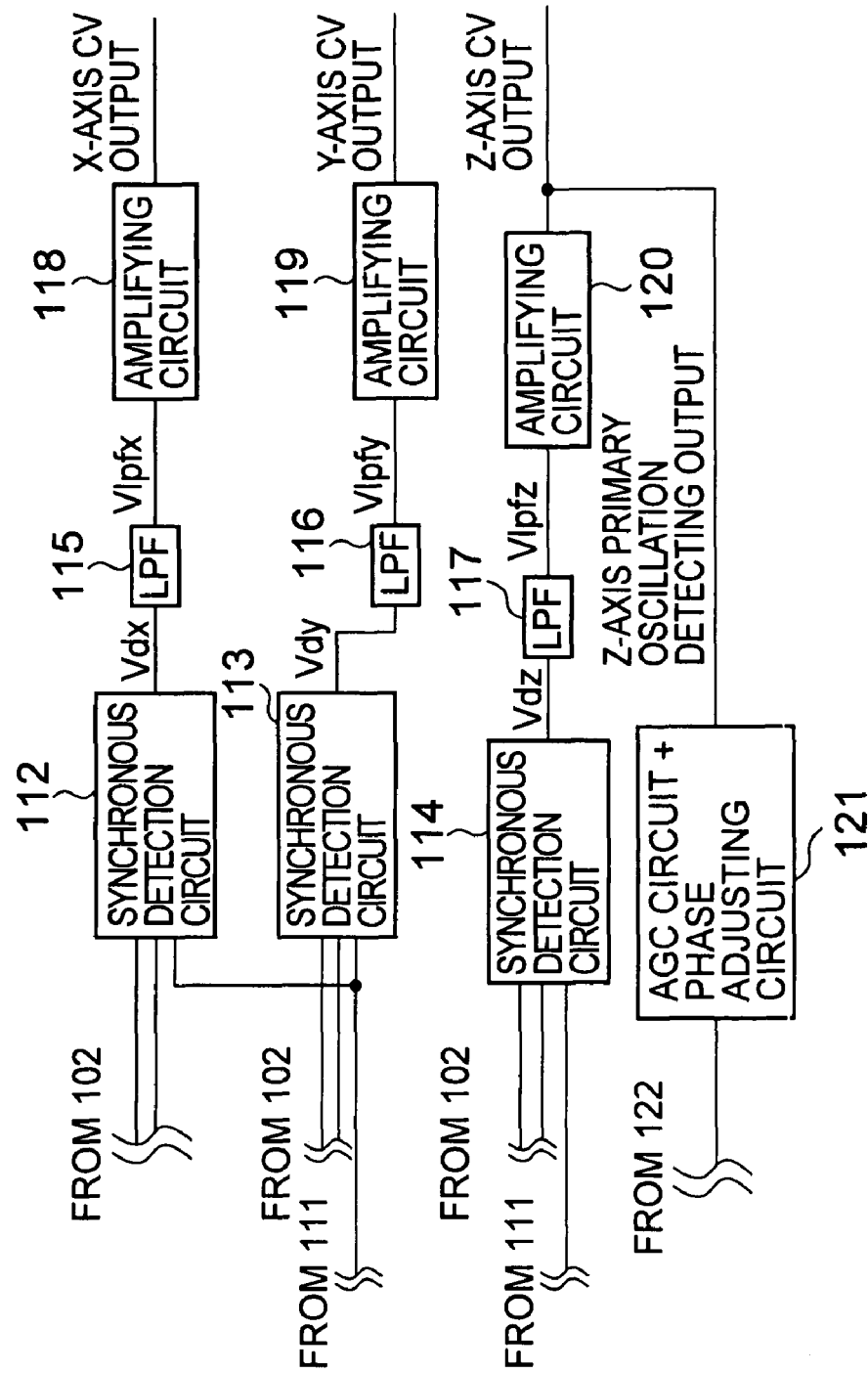

FIG. 13

| SWITCHING CIRCUIT NO | TERMINAL CONDUCTED TO SWITCHING CIRCUIT TERMINAL 1 | | |
|---|---|---|---|
| | IN DETECTING X | IN DETECTING Y | IN DETECTING Z |
| SWITCHING CIRCUIT a | 2 | 3 | 2 |
| SWITCHING CIRCUIT b | 3 | 2 | 2 |
| SWITCHING CIRCUIT c | 3 | 3 | 2 |
| SWITCHING CIRCUIT e | 2 | 2 | 3 |
| SWITCHING CIRCUIT f | 2 | 2 | 3 |
| SWITCHING CIRCUIT g | 2 | 2 | 3 |

FIG. 15

| SWITCHING CIRCUIT NO. | TERMINAL CONDUCTED TO SWITCHING CIRCUIT TERMINAL 1 | | |
|---|---|---|---|
| | IN DETECTING X | IN DETECTING Y | IN DETECTING Z |
| SWITCHING CIRCUIT a | 2 | 3 | 2 |
| SWITCHING CIRCUIT b | 3 | 2 | 2 |
| SWITCHING CIRCUIT c | 3 | 3 | 2 |
| SWITCHING CIRCUIT h | 3 | 3 | 2 |

FIG. 16

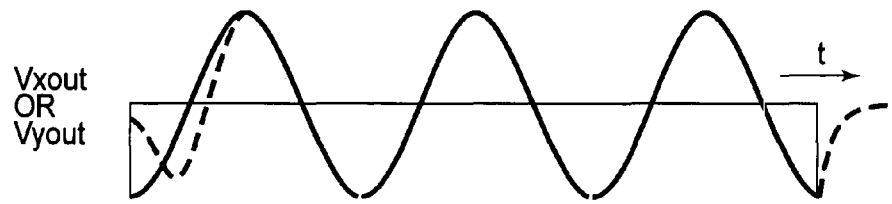

Vxout OR Vyout

FIG. 17

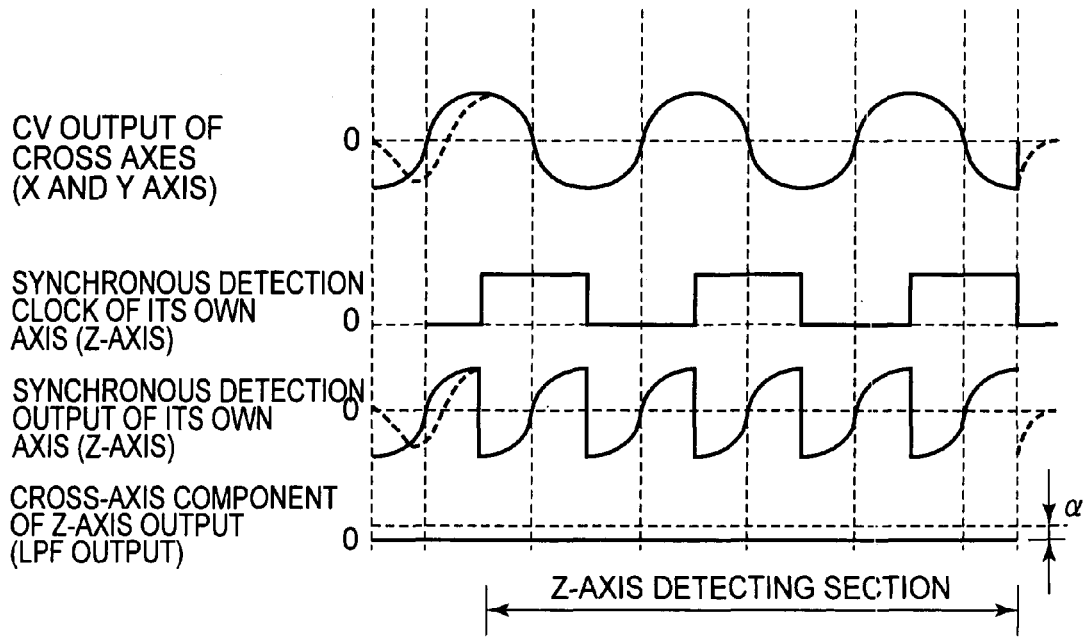

CV OUTPUT OF CROSS AXES (X AND Y AXIS)

SYNCHRONOUS DETECTION CLOCK OF ITS OWN AXIS (Z-AXIS)

SYNCHRONOUS DETECTION OUTPUT OF ITS OWN AXIS (Z-AXIS)

CROSS-AXIS COMPONENT OF Z-AXIS OUTPUT (LPF OUTPUT)

Z-AXIS DETECTING SECTION

DYNAMIC AMOUNT SENSOR

BACKGROUND OF THE INVENTION

1. Field of the Invention

The present invention relates to a dynamic amount sensor for detecting a dynamic amount of an angular velocity, an acceleration or the like applied to a body, and particularly relates to a dynamic amount sensor of an electrostatic capacitance detecting type for detecting an applied dynamic amount or quantity based on a change in an electrostatic capacitance.

2. Description of the Related Art

A dynamic amount sensor of an acceleration sensor or an angular velocity sensor is used in a wide field of a hand blurring correcting apparatus of a video camera, an air bag apparatus for vehicle mount use, an attitude control apparatus of a robot and the like.

In the dynamic amount sensors, there is a sensor of an electrostatic capacitance detecting type for detecting a displacement of a mass by a change in an electrostatic capacitance between a movable electrode provided at a mass (mass body) constituting a movable member and a fixed electrode provided to face the movable electrode in an opposed manner and detecting a dynamic amount based on the displacement of the mass.

There is used a C/V (electrostatic capacitance/voltage) connecting apparatus for converting an electrostatic capacitance into a voltage in correspondence therewith for detecting a change in the electrostatic capacitance between a movable electrode and a fixed electrode in a dynamic amount sensor of an electrostatic capacitance detecting type.

A patent reference described below proposes a technology in which in a dynamic amount sensor of an electrostatic capacitance detecting type using a C/V converting apparatus (converting circuit), a dynamic amount operated in a plurality of axial directions is detected by a single sensor.

Patent Reference 1: JP-A-2004-279261

Patent Reference 1 proposes an acceleration sensor of a two-axis detection type including a sensor element portion in which a capacitance is changed in accordance with an acceleration in x-axis direction and a sensor element portion in which a capacitance is changed in accordance with an acceleration in y-axis direction.

In details, there is constructed a constitution in which the accelerations are outputted based on changes in electrostatic capacitances between movable electrodes and fixed electrodes exclusive for respective detecting axes in the sensor element portions provided in correspondence with the respective detecting axes.

Patent Reference 1 proposes a technology in which an x-axis signal processing circuit and a y-axis signal processing Circuit are operated by switching sampling timings thereof in order to restrain crosstalk (interference with cross axis).

The acceleration sensor described in Patent Reference 1 is constituted to alternately detect the acceleration in x-axis direction and the acceleration in y-axis direction while switching the sampling timings.

Therefore, for example, during a time period of detecting the acceleration in the sensor element portion in x-axis direction on one side, the sensor element portion in y-axis direction on other side is brought into an unfunctioned state (rest state).

Therefore, according to the acceleration sensor described in Patent Reference 1, the sensor element portions provided at inside of the sensor, that is, the fixed electrodes for detection are not effectively utilized.

SUMMARY OF THE INVENTION

Hence, it is an object of the invention to provide a dynamic amount sensor capable of effectively utilizing an arranged fixed electrode.

According to a first aspect of the invention, the object is achieved by a dynamic amount sensor comprising a frame having a hollow portion, a beam having a flexibility fixed to the frame, a mass which is supported by the frame by way of the beam, a surface portion of which functions as a movable electrode, and an attitude of which is changed by an operation of an external force, a plurality of fixed electrodes which is arranged to face the mass in an opposed manner, detecting means for detecting a change in an electrostatic capacitance of an electrostatic capacitance element comprising the movable electrode and the fixed electrode, switching means for switching the detecting means to a connecting state of a first detecting circuit for detecting the change in the electrostatic capacitance of the electrostatic capacitance element in accordance with a change in an attitude in a first detecting axis direction of the mass and a connecting state of a second detecting circuit for detecting the change in the electrostatic capacitance of the electrostatic capacitance element in accordance with a change in an attitude in a second detecting axis direction of the mass by switching a wire connecting state of the electrostatic capacitance element, and dynamic amount outputting means for outputting a first detecting axis direction component and a second detecting axis direction component of an operated dynamic amount based on a result of detection of the detecting means.

According to the second aspect of the invention, there is provided the dynamic amount sensor according to the first aspect, wherein the switching means switches the detecting means to the connecting state of the first detecting circuit, the connecting state of the second detecting circuit, and a connecting state of a third detecting circuit for detecting the change in the electrostatic capacitance of the electrostatic capacitance element in accordance with a change in a third detecting axis direction of the mass by switching the wire connecting state of the electrostatic capacitance element, and wherein the dynamic amount outputting means outputs the first detecting axis direction component, the second detecting axis direction component, and a third detecting axis direction component of the operated dynamic amount based on the result of detection of the detecting means.

According to a third aspect of the invention, there is provided the dynamic amount sensor according to the first aspect or the second aspect, wherein the switching means switches wire connecting states of the electrostatic capacitance elements at each constant period based on timings of a control clock signal, wherein output signals of the detecting means are inputted to the same amplifying circuit, and wherein the dynamic amount outputting means outputs the dynamic amount operated in respective axes directions of the mass after separating detecting signals of the electrostatic capacitances of the respective detecting circuits by carrying out a time division processing based on the switching timings by the switching means.

According to the fourth aspect of the invention, there is provided the dynamic amount sensor according to the first aspect, the second aspect or the third aspect, wherein the first detecting circuit includes a circuit connected in series with the electrostatic capacitance elements electrostatic capacitances of which are symmetrically changed in accordance with an inclination in the first detecting axis direction of the mass, wherein the second detecting circuit includes a circuit connected in series with the electrostatic capacitance elements electrostatic capacitances of which are symmetrically changed in accordance with an inclination in the second detecting axis direction of the mass, and wherein respectives of the electrostatic capacitance elements connected in series of the first detecting circuit and the second detecting circuit include carrier wave applying means for applying carrier waves phases of which are inverted from each other by 180°.

According to a fifth aspect of the invention, there is provided the dynamic amount sensor according to the fourth aspect, wherein the third detecting circuit includes a circuit connected in series with the electrostatic capacitance elements electrostatic capacitances of which are symmetrically changed in accordance with an inclination in the third detecting axis direction of the mass, and wherein the carrier wave applying means includes carrier wave applying means for applying carrier waves phases of which are inverted from each other by 180° to respectives of the electrostatic capacitance elements connected in series of the third detecting circuit.

According to the sixth aspect of the invention, there is provided the dynamic amount sensor according to any one of the first aspect through the fifth aspect, wherein the fixed electrode includes four of first electrodes constituting a reference position by a center position of the mass and arranged at equal intervals around the reference position on the same plane, wherein the first detecting circuit includes a circuit connected in series with a circuit connected in parallel with the electrostatic capacitance element constituted by the first electrode disposed in a first quadrant on an x-y plane of the four first electrodes and the movable electrode, and the electrostatic capacitance element constituted by the first electrode disposed in a second quadrant and the movable electrode, and a circuit connected in parallel with the electrostatic capacitance element constituted by the first electrode disposed in a fourth quadrant on the x-y plane of the four first electrodes and the movable electrode and the electrostatic capacitance element constituted by the first electrode disposed in a third quadrant and the movable electrode, wherein the second detecting circuit includes a circuit connected in series with a circuit connected in parallel with the electrostatic capacitance element constituted by the first electrode disposed in the first quadrant on the x-y plane of the four first electrodes and the movable electrode, and the electrostatic capacitance element constituted by the first electrode disposed in the fourth quadrant and the movable electrode, and a circuit connected in parallel with the electrostatic capacitance element constituted by the first electrode disposed in the third quadrant on the x-y plane and the movable electrode, and the electrostatic capacitance element constituted by the first electrode disposed in the second quadrant and the movable electrode, and wherein the switching means switches the wire connecting states of the electrostatic capacitance elements such that the detecting means constitutes the first detecting circuit or the second detecting circuit.

According to the seventh aspect of the invention, there is provided the dynamic amount sensor according to the sixth aspect, wherein the fixed electrode further includes four of second electrodes on a plane opposed to the four first electrodes by way of the mass, wherein the first detecting circuit includes a circuit connected in parallel with the electrostatic capacitance element constituted by the second electrode disposed in the fourth quadrant on the x-y plane of the four second electrodes and the movable electrode, and the electrostatic capacitance element constituted by the second electrode disposed in the third quadrant on the x-y plane and the movable electrode, and the electrostatic capacitance element constituted by the first electrode disposed in the first quadrant on the x-y plane and the movable electrode, further, connected in parallel with the electrostatic capacitance element constituted by the second electrode disposed in the first quadrant on the x-y plane of the four second electrodes, and the electrostatic capacitance element constituted by the second electrode disposed in the second quadrant on the x-y plane and the movable electrode and the movable electrode, and the electrostatic capacitance element constituted by the first electrode disposed in the third quadrant on the x-y plane and the movable electrode, and wherein the second detecting circuit includes a circuit connected in parallel with the electrostatic capacitance element constituted by the second electrode disposed in the first quadrant on the x-y plane of the four second electrodes and the movable electrode, and the electrostatic capacitance element constituted by the second electrode disposed in the fourth quadrant on the x-y plane and the movable electrode, and the electrostatic capacitance element constituted by the first electrode disposed in the third quadrant on the x-y plane and the movable electrode, further, connected in parallel with the electrostatic capacitance element constituted by the second electrode disposed in the third quadrant on the x-y plane of the four second electrodes and the movable electrode, and the electrostatic capacitance element constituted by the second electrode disposed in the second quadrant on the x-y plane and the movable electrode, and the electrostatic capacitance element constituted by the first electrode disposed in the first quadrant on the x-y plane and the movable electrode.

According to an eighth aspect of the invention, there is provided the dynamic amount sensor according to the sixth aspect, wherein the fixed electrode further includes a third electrode on the plane opposed to the four first electrodes by way of the mass, and wherein the third detecting circuit includes a circuit connected in series with the electrostatic capacitance element constituted by the first electrode and the movable electrode and the electrostatic capacitance element constituted by the third electrode and the movable electrode.

According to a ninth aspect of the invention, there is provided the dynamic amount sensor according to any one of the third aspect through the eighth aspect, wherein the dynamic amount outputting means separates detecting signals of the electrostatic capacitances of the respective detecting circuits after an elapse of a predetermined time period from a timing of switching connection by the switching means.

According to a tenth aspect of the invention, there is provided the dynamic amount sensor according to the ninth aspect, wherein the predetermined time period is provided within a range of 3 through 4 τ from the timing of switching the connection by the switching means.

According to the invention, by switching the wire connecting state of the electrostatic capacitance element comprising the movable electrode and the fixed electrode by the switching means, the fixed electrode can be used both in the first detecting circuit and in the second detecting circuit, and therefore, when respective detecting axis direction components of the operated dynamic amount are detected, the fixed electrode can effectively be utilized. Thereby, detection sensitivity (detection accuracy) can be promoted.

BRIEF DESCRIPTION OF THE DRAWINGS

FIG. 5 is a time chart showing signal waveforms of respective portions in a C/V converting circuit;

FIG. 6 is a circuit block diagram showing a C/V converting circuit in an angular velocity sensor shown in a first modified example;

FIG. 10 is a table showing a relationship between a state of connecting a switching circuit in the angular velocity sensor shown in the second modified example and a detection mode of a constituted triaxial detecting circuit;

FIG. 13 is a table showing a relationship between a state of connecting a switching circuit in the angular velocity sensor shown in the third modified example and a detection mode of a constituted triaxial detecting circuit;

FIG. 15 is a table showing a relationship between a state of connecting a switching circuit in the angular velocity sensor shown in the fourth modified example and a detection mode of a constituted triaxial detecting circuit;

FIG. 16 is a diagram showing an example of a depressed signal waveform;

FIG. 17 is a diagram showing an example of a crosstalk to a detecting circuit in z-axis;

DETAILED DESCRIPTION OF THE PREFERRED EMBODIMENT

Figure 1:
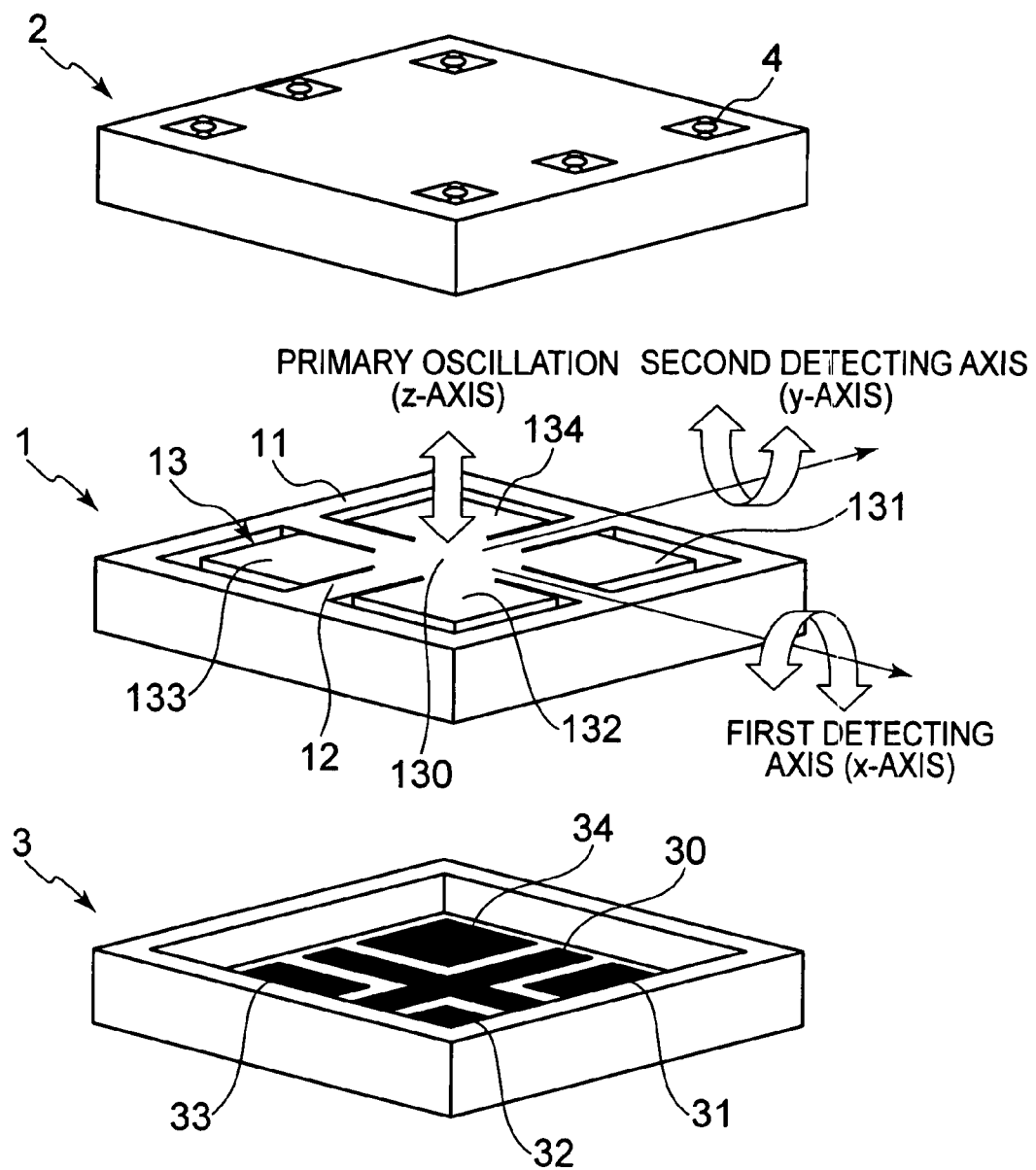
FIG. 1 is a perspective view showing an outline structure of a sensor portion in an angular velocity sensor according to an embodiment.

A preferred embodiment of the invention will be explained in details in reference to FIG. 1 through FIG. 19 as follows.

(1) Outline of Embodiment

According to the embodiment, an explanation will be given of an angular velocity sensor for detecting a displacement of an attitude state of a mass supported by a frame by a flexible beam based on an amount of a change in an electrostatic capacitance between a fixed electrode and a movable electrode (mass) and measuring an angular velocity applied (hereinafter "operated") to the mass based on a result of detecting the displacement of the attitude state of the mass.

The angular velocity sensor according to the embodiment detects inclinations in x-axis and y-axis directions when a Coriolis force is generated by an angular velocity operated to a mass vibrating in z-axis direction by a two-axis detecting circuit.

The two-axis detecting circuit comprises a fixed electrode having both of an x-axis detecting circuit function and a y-axis detecting circuit function and also having a function of detecting the inclination in the x-axis direction and the inclination in the y-axis direction.

The angular velocity sensor includes a switching circuit for switching an x-axis detecting circuit and a y-axis detecting circuit in the two-axis detecting circuit.

The angular velocity sensor includes a driving circuit for driving to vibrate the mass at a constant frequency and includes a z-axis detecting circuit for detecting a displacement in the z-axis direction of the mass which is needed in controlling a position of the mass when the driving circuit is controlled.

There is used a carrier wave applied to the two-axis detecting circuit having a phase shifted from a phase of a carrier wave applied to the z-axis detecting circuit by 90°.

In switching the x-axis detecting circuit and the y-axis detecting circuit in the two-axis detecting circuit, the switching is carried out alternately at each constant period based on a timing of a specific clock signal.

Outputs of the two-axis detecting circuit (x-axis detecting circuit, y-axis detecting circuit) and the z-axis detecting circuit are summarizingly inputted to a current/voltage converting circuit to be subjected to an amplifying and converting processing.

An output signal (synthesized signal) of the current/voltage converting circuit is inputted to three synchronous detection circuits, and in the respective synchronous detection circuits, an x-axis detecting signal component, a y-axis detecting signal component, a z-axis detecting circuit component are separated and extracted.

In the synchronous detection circuit, by subjecting the synthesized signal to a specific phase division processing, the z-axis detecting signal component is separated from the x-axis detecting signal component and the y-axis detecting signal component, further, the x-axis detecting signal component and the y-axis detecting signal component are separated by being subjected to time division based on a timing of switching the carrier wave, that is, the clock signal.

An angular velocity operated around x-axis is detected based on the x-axis detecting signal component separated in the synchronous detection circuit, and an angular velocity operated around y-axis is detected based on the y-axis detecting signal component separated thereby.

The displacement of the mass in the z-axis direction is detected based on the z-axis detecting signal component and a primary oscillation drive control of the mass is carried out based on a detection result of the displacement of the mass.

In this way, according to the embodiment, in the synchronous detection circuit, the detecting signal components in the respective axial directions can be separated from the synthesized signal after having been amplified by a combination of the phase division processing and the time division processing, and therefore, processing of amplifying the output of the x-axis detecting circuit, the output of the y-axis detecting circuit and the output of the z-axis detecting circuit can simultaneously be carried out by using the signal current/voltage converting circuit.

According to the embodiment, the x-axis detecting circuit and the y-axis detecting circuit can be switched by the switching circuit, and therefore, the fixed electrode can be used both for the x-axis detecting circuit and the y-axis detecting circuit.

Thereby, in the x-axis detecting circuit and the y-axis detecting circuit, the displacement in the respective axial directions of the mass can be detected based on a total sum of electrode sensitivities of the fixed electrodes (detection electrodes), and therefore, the detection sensitivity (detection accuracy) of the sensor can pertinently be promoted.

(2) Details of Embodiment

The angular velocity sensor according to the embodiment is a semiconductor sensor element formed by working a semiconductor substrate (hereinafter, "semiconductor board"). Further, the semiconductor board can be worked by using an MEMS (microelectromechanical system) technology.

A direction the same as a direction of laminating respective layers of the board constituting the angular velocity sensor is defined as an up and down direction, that is, z-axis (direction). Further, axes orthogonal to the z-axis and orthogonal to each other are defined as x-axis (direction) and y-axis (direction). That is, the x-axis, the y-axis, the z-axis become three axes orthogonal to each other.

The angular velocity sensor according to the embodiment includes a sensor portion for detecting a change in an attitude of a mass as an electric signal and a signal processing portion (control portion) for processing the detected electric signal.

An explanation will be given here by dividing the angular velocity sensor into the sensor portion and the signal processing portion (control portion).

FIG. 1 is a perspective view showing an outline structure of a sensor portion in an angular velocity sensor according to an embodiment.

Although in FIG. 1, in order to express a structure of the angular velocity sensor to be easy to understand, structures of respective layers are separately expressed, actually, the angular velocity sensor is constituted in a state of laminating the respective layers.

As shown by FIG. 1, the angular velocity sensor is constituted by a three layer structure interposing a movable portion structure 1 by an upper glass board 2 and a lower glass board 3 in an up and down direction.

Figure 2A:
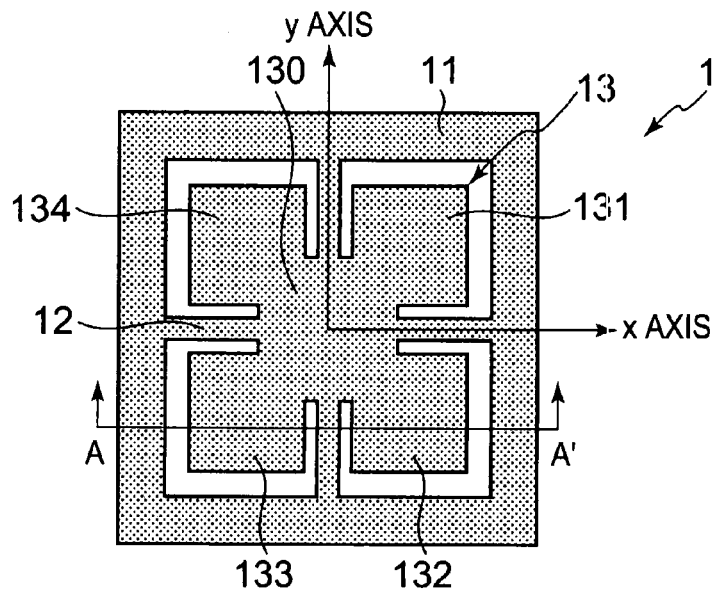
FIG. 2A shows a plane view viewing a movable portion structure from a side of an upper glass board.

FIG. 2A shows a plane view viewing the movable portion structure 1 from a side of the upper glass board 2.

As shown by the drawing, the movable portion structure 1 is formed with a frame 11, beams 12 and a mass 13 by etching a silicon substrate (hereinafter "silicon board").

The frame 11 is a fixed portion provided at a peripheral edge portion of the movable portion structure 1 to surround the mass 13 and constitutes a framework of the movable portion structure 1.

The beams 12 are four strip-like thin members extended from a center of the mass 13 in radial directions (in directions of the frame 11) in cross directions and provided with flexibility.

The mass 13 is constituted by a mass portion 130 in a square column shape disposed at a center portion, and mass portions 131 through 134 in a square column shape arranged at four corners of the mass portion 130 by respectively maintaining balance. Further, the mass portions 130 through 134 are integrally formed as a continuous solid.

The mass 13 is a mass body fixed to the frame 11 by the four beams 12. The mass 13 can be vibrated or moved to twist by a force exerted from outside by operation of the beams 12. The mass 13 is provided with an electrical conductivity and a surface thereof functions as a movable electrode.

Figure 2B:
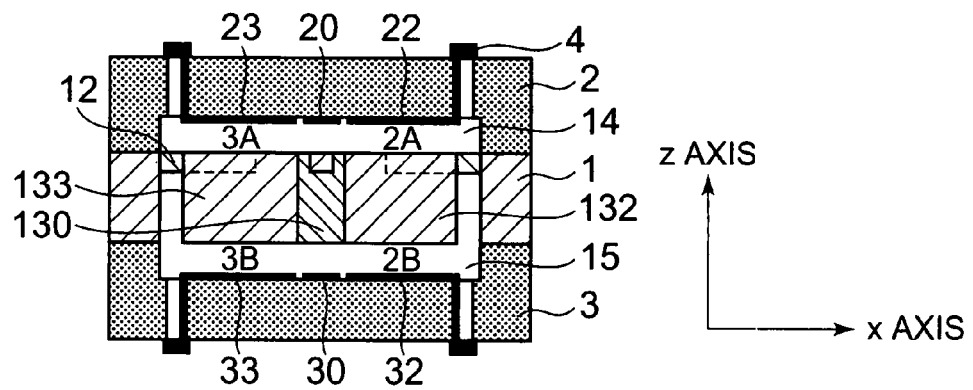
FIG. 2B shows a section of the angular velocity sensor at an A-A' portion shown in FIG. 2A.

FIG. 2B is a view showing a section of the angular velocity sensor at an A-A' portion shown in FIG. 2A.

As shown by the drawing, a clearance 14 for making the mass 13 movable is formed between upper faces of the beams 12 and the mass 13 (faces opposed to the upper glass board 2) and the upper glass board 2. The upper glass board 2 is bonded thereto to seal the clearance 14.

A clearance 15 for making the mass 13 movable is formed between lower faces of the beams 12 (faces opposed to the lower glass board 3) and a bottom face, that is, a lower face of the mass 13 (face opposed to the lower glass board 3) and the lower glass board 3, further, also at a peripheral portion of the mass 13. The lower glass board 3 is bonded thereto to seal the clearance 15. The clearances 14, 15 can reduce an air resistance in operating the mass 13 by being brought into a vacuum state.

The frame 11, the beam 12, the mass 13 of the movable portion structure 1 are formed by utilizing a D-RIE (deep reactive ion etching) technology for subjecting the silicon board to deep trench etching by plasma.

Although in the angular velocity sensor according to the embodiment, the movable structure 1 is formed by using the silicon board, a member of forming the movable portion structure 1 is not limited thereto. For example, the movable portion structure may be formed by using an SOI (silicone on insulator) board embedded with an oxide film at a middle layer of at silicon board.

In this case, during etching processing of the beam 12 and the mass 13, the middle oxide film layer functions as an etching block layer (stop layer), and therefore, an etching processing accuracy in a thickness of the beam 12 and the mass 13 is very high.

The upper glass board 2 and the lower glass board 3 are fixed boards bonded to seal the movable portion structure 1. The upper glass board 2 and the lower glass board 3 are respectively bonded to the frame 11 of the movable portion structure 1 by anodic bonding.

The anodic bonding is a bonding method of applying a cathode voltage to a side of the glass board (upper glass board 2, lower glass board 3) and bonding the glass board thereto by utilizing an electrostatic attraction force between glass and silicon.

The method of bonding the glass board and the movable portion structure 1 is not limited to anodic bonding. For example, eutectic bonding for bonding these by laminating a metal at bonding faces or the like may be used.

The upper glass board 2 and the lower glass board 3 are provided with drive electrodes for driving to vibrate the mass 13 and a plurality of fixed electrodes for detecting an attitude of the mass 13.

Figure 3:
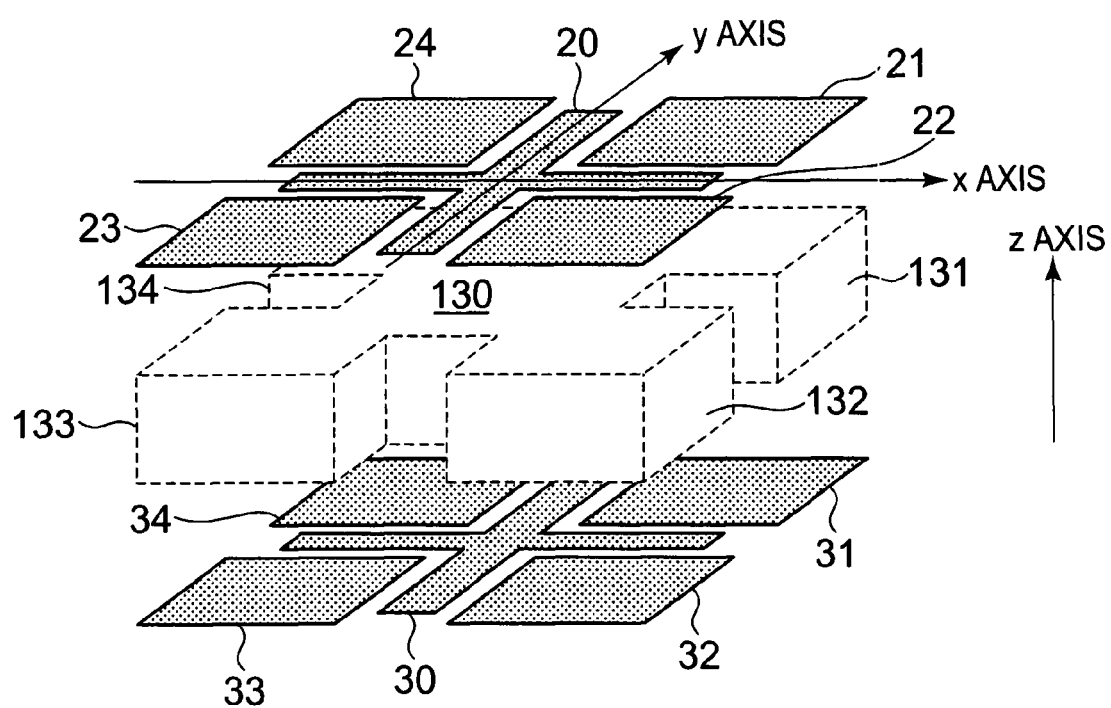
FIG. 3 is a view showing a state of arranging a fixed electrode and a drive electrode provided at the angular velocity sensor.

FIG. 3 is a view showing a state of arranging the fixed electrode and the drive electrode provided at the angular velocity sensor.

In FIG. 3, only the electrodes and the mass 13 are shown in order to clearly show a relationship of arranging the respective electrodes and the mass 13.

As shown by FIG. 3, the upper glass board 2 is provided with a fixed electrode 20 extended in cross directions along x-axis and y-axis centering on the mass portion 130 at a portion thereof opposed to the mass portion 130.

The upper glass board 2 is provided with a fixed electrode 21 at a portion (first quadrant on x-y plane) opposed to the mass portion 131, a fixed electrode 22 at a portion (fourth quadrant on x-y plane) opposed to the mass portion 132, a fixed electrode 23 at a portion (third quadrant on x-y plane)

opposed to the mass portion 133, and a fixed electrode 24 at a portion (second quadrant on x-y plane) opposed to the mass portion 134.

Similarly, the lower glass board 3 is provided with a drive electrode 30 extended in cross directions along x-axis and y-axis centering on the mass portion 130 at a portion thereof opposed to the mass portion 130.

The lower glass board 3 is provided with a fixed electrode 31 at a portion opposed to the mass portion 131, a fixed electrode 32 at a portion opposed to the mass portion 132, a fixed electrode 33 at a portion opposed to the mass portion 133, and a fixed electrode 34 at a portion opposed to the mass portion 134.

The fixed electrode 20 is an electrode for detecting a displacement in the z-axis direction of the mass 13 and the drive electrode 30 is an electrode for driving to vibrate the mass 13.

The fixed electrodes 21 through 24 and the fixed electrodes 31 through 34 are detecting electrodes for detecting angular velocities operated around a first detecting axis (x-axis) and a second detecting axis (y-axis).

In the angular velocity sensor according to the embodiment, the respective fixed electrodes 21 through 24 and 31 through 34 are provided with both a function of detecting an inclination in the x-axis direction of the mass 13 and a function of detecting an inclination in the y-axis direction thereof.

In the angular velocity sensor according to the embodiment, a capacitor (electrostatic capacitance element) 1A is formed by the fixed electrode 21 and a movable electrode (mass 13), a capacitor 2A is constituted by the fixed electrode 22 and the movable electrode, a capacitor 3A is constituted by the fixed electrode 23 and the movable electrode, and a capacitor 4A is constituted by the fixed electrode 24 and the movable electrode.

Similarly, a capacitor 1B is constituted by the fixed electrode 31 and the movable electrode, a capacitor 2B is constituted by the fixed electrode 32 and the movable electrode, a capacitor 3B is constituted by the fixed electrode 33 and the movable electrode, and a capacitor 4B is constituted by the fixed electrode 34 and the movable electrode.

A capacitor ZA is constituted by the fixed electrode 20 and the movable electrode and a capacitor ZB is constituted by the drive electrode 30 and the movable electrode.

As shown by FIG. 1 and FIG. 2B, the upper glass board 2 and the lower glass board 3 are provided with pluralities of electrode pads 4 for leading out potentials of the respective electrodes and a potential of the mass 13, that is, signals detected by the sensor portion to outside of the sensor portion.

The electrode pads 4 are connected to the respective electrodes by way of lead out lines provided at inner peripheral walls of through holes penetrated in thickness directions of the respective glass boards.

The electrode pads 4 are connected to a C/V converting circuit at inside of the signal processing portion (control portion) mentioned later.

Next, operation of the sensor portion of the angular velocity sensor constituted in this way will be explained.

As shown by FIG. 1, the angular velocity sensor according to the embodiment uses a system of detecting angular velocities applied around the first detecting axis (x-axis) and the second detecting axis (y-axis) by subjecting the mass 13 to primary oscillation in the up and down direction (z-axis direction) and generating a Coriolis force at the vibrating mass 13 moving.

In details, an alternating current voltage is applied between the drive electrode 30 and the movable electrode (mass 13), that is, to the capacitor ZB to vibrate the mass 13 in the up and down direction (z-axis direction) by using operation of an electrostatic force operated between the electrodes.

In the angular velocity sensor according to the embodiment, there is carried out a driving processing of applying the alternating current voltage to the capacitor ZB by using a feedback control based on a change in an attitude of the mass 13 in the z-axis direction, that is, a result of detecting a change in an electrostatic capacitance of the capacitor ZA.

A frequency of the alternating current voltage applied for vibrating the mass 13 in the up and down direction, that is, a frequency of vibrating the mass 13 is set to, for example, a resonance frequency f to a degree of 3 kHz for vibrating to resonate the mass 13. A large displacement amount of the mass 13 can be provided by vibrating the mass 13 by the resonance frequency f.

When an angular velocity $\Omega$ is applied around the mass 13 of a mass m vibrated at a speed v, Coriolis force of "F=2mv$\Omega$" is generated at the center of the mass 13 in a direction orthogonal to a direction of moving the mass 13.

When the Coriolis force F is generated, the mass 13 is twisted and the attitude of the mass 13 is changed. That is, the mass 13 is inclined relative to a face orthogonal to a vibrating direction of the mass 13. By detecting the change in the attitude of the mass 13 (inclination, twist amount), a direction and a magnitude of the operated angular velocity are detected.

Figure 2C:
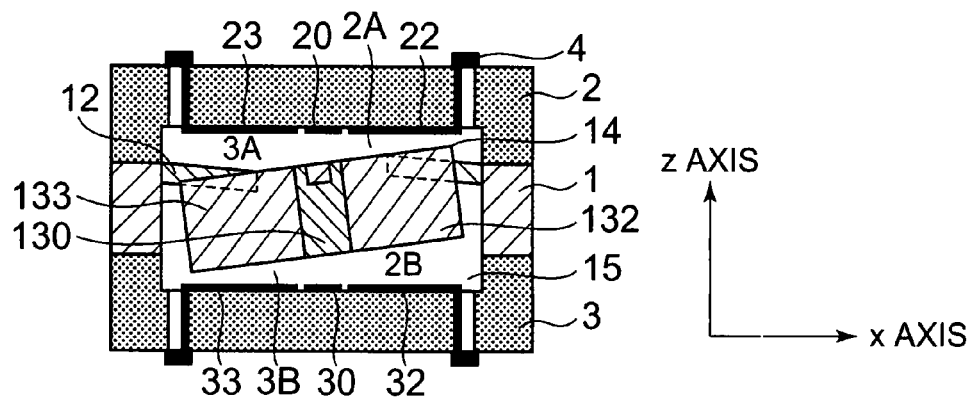
FIG. 2C is a view showing a state of changing an attitude of a mass.

FIG. 2C is a view showing a state of changing the attitude of the mass 13.

For example, when Coriolis force is generated by operating an angular velocity around the second detecting axis (y-axis) of the mass 13, and the attitude of the mass 13 is inclined relative to the x-axis as shown by FIG. 2C, a distance between the fixed electrode and the movable electrode (the mass 13) is changed.

In details, distances between the fixed electrode 22 and the movable electrode and between the fixed electrode 33 and the movable electrode are reduced, on the other hand, distances between the fixed electrode 32 and the movable electrode and between the fixed electrode 23 and the movable electrode are increased.

The changes in the distances between the electrodes emerge as changes in electrostatic capacitances between the electrodes, and therefore, the change in the attitude of the mass 13 can be detected based on the changes in the electrostatic capacitances of the capacitors 2A, 3A and the capacitors 2B, 3B.

The change in the distance between the electrodes, that is, the change in the electrostatic capacitance between the electrodes can electrically be detected by using the C/V converting circuit of the signal processing portion (control portion) mentioned later.

The generated Coriolis force F is detected based on the detected change in the attitude of the mass 13 (direction of inclination, degree of inclination or the like). The angular velocity $\Omega$ is calculated (derived) based on the detected Coriolis force F. That is, in the signal processing portion, the amount of the change in the attitude of the mass 13 is converted into the angular velocity.

Although an explanation has been given here of the case of operating the angular velocity around the second detecting axis (y-axis) of the mass 13, also in a case of operating an angular velocity around the first detecting axis (x-axis) of the mass 13, similarly, the operated angular velocity can be measured by detecting a change in the attitude of the mass 13 based on a change in the distance between the fixed electrode and the movable electrode.

Next, an explanation will be given of the signal processing portion (control portion) for processing a signal detected by the sensor portion of the angular velocity sensor according to the embodiment.

Figure 4A:
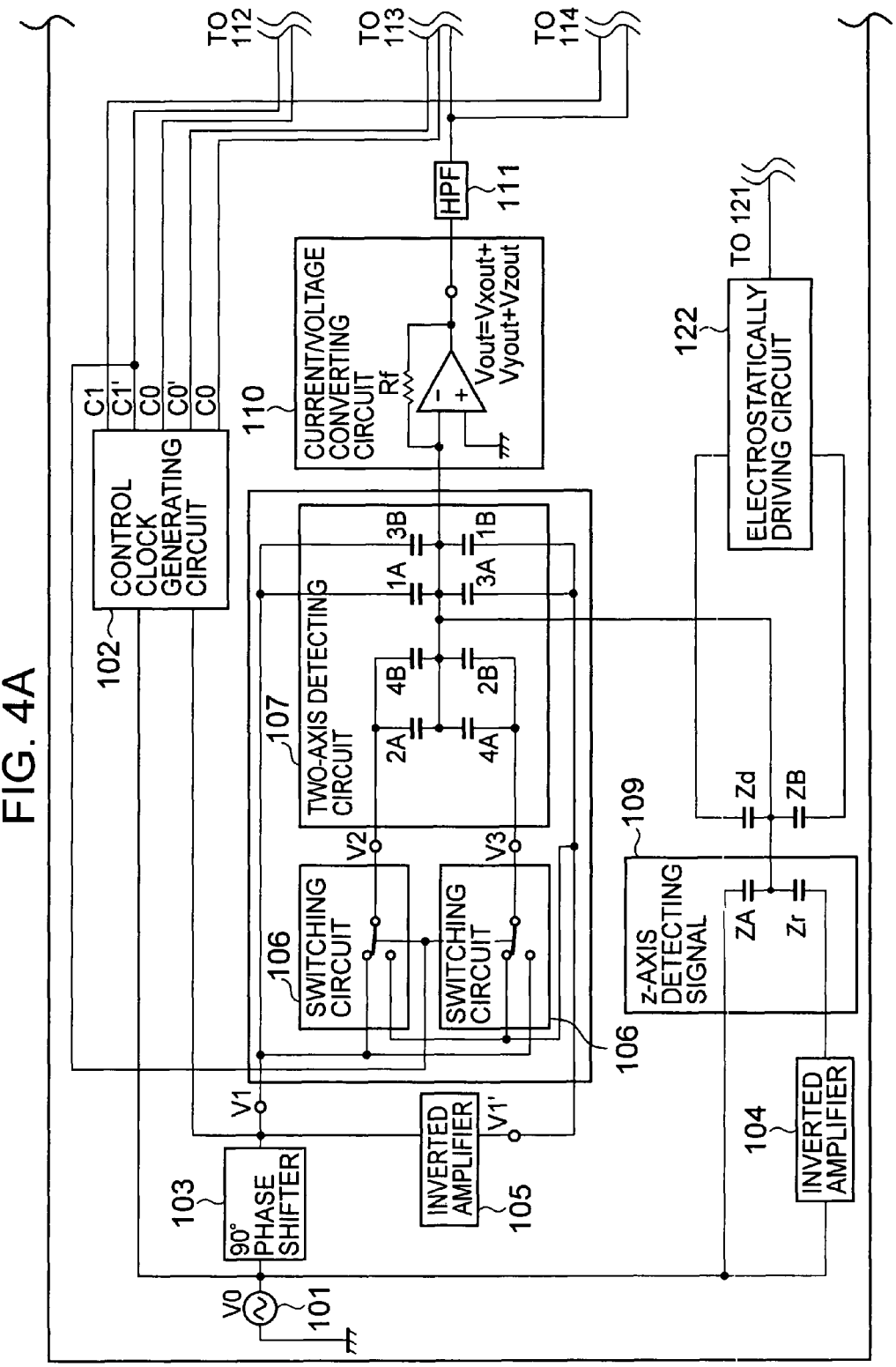
FIG. 4 is a circuit block diagram showing an outline structure of a signal processing portion (control portion) in the angular velocity sensor according to the embodiment.

FIG. 4 is a circuit block diagram showing an outline structure of the signal processing portion (control portion) in the angular velocity sensor according to the embodiment.

As shown by FIG. 4B, the signal processing portion includes a C/V converting circuit 100, an X-axis angular velocity detecting circuit 200, a Y-axis angular velocity detecting circuit 300.

According to the signal processing portion of the angular velocity sensor, the signal is processed in the X-axis angular velocity detecting circuit 200 and the Y-axis angular velocity detecting circuit 300 based on detecting signals in the respective axis directions processed in the C/V converting circuit 100 and thereafter, finally outputted from the angular velocity sensor as an x-axis angular velocity output and a y-axis angular velocity output.

According to the C/V converting circuit 100, the changes in the distances between the fixed electrodes 21 through 24, 31 through 34 and the movable electrode (mass 13) in the sensor portion, that is, the displacements of the mass 13 in the respective axis directions are detected based on the changes in the electrostatic capacitances of the capacitors and converted into the detecting signals having voltage values (magnitudes) in correspondence therewith for the respective axial direction components.

A first stage of the C/V converting circuit 100 is constituted by a current/voltage (I/V) converting circuit 110 using a differential capacitance detecting system.

The differential capacitance detecting system is a system of applying carrier waves phases of which are inverted from each other by 180° to both ends of capacitors connected in series, outputting a current signal indicating a difference between electrostatic capacitances of the both capacitors from a point of connecting the capacitors to be inputted to an inverted amplifying circuit to thereby provide a voltage signal in proportion to the difference between the electrostatic capacitances.

As shown by FIG. 4, the C/V converting circuit 100 includes an alternating current voltage source 101 and the alternating current voltage source 101 is connected respectively to a control clock generating circuit 102, a 90° phase shifter 103, one end of the capacitor ZA, and an inverted amplifier 104.

Other end of the 90° phase shifter 103 is connected respectively to the control clock generating circuit 102, a switching circuit 106, and an inverted amplifier 105.

The C/V converting circuit 100 includes a two-axis detecting circuit 107 for detecting a displacement around x-axis and a displacement around y-axis in the mass 13 and a z-axis detecting circuit 109 for detecting a displacement in a z-axis direction.

The two-axis detecting circuit 107 is constituted by the capacitors 1A through-4A constituted by the fixed electrodes 21 through 24 (FIG. 3) provided at the upper glass board 2 and the movable electrode, and, the capacitors 1B through 4B constituted by the fixed electrodes 31 through 34 (FIG. 3) provided at the lower glass board 3 and the movable electrode.

As shown by FIG. 4, the two-axis detecting circuit 107 having both (serving also as) functions of the x-axis detecting circuit and the y-axis detecting circuit is constituted by the capacitors 1A through 4A, 1B through 4B one ends of which are connected to the same point (input point of the current/voltage converting circuit 110).

The point connected (fixed) with the one ends of the capacitors previously is referred to as a common point.

Connecting points of other end sides of the capacitors 1A through 4A, 1B through 4B are switched by using a pair of the switching circuits 106 operated in synchronism with a clock signal C1'. The connecting points of the other end sides of the capacitors 1A through 4A are made to constitute varying ends.

That is, wire connecting states of the capacitors 1A through 4A, 1B through 4B are switched by using the switching circuits 106.

There are present two modes of switching the wire connecting states in the switching circuits 106, one is a mode of constituting the x-axis detecting circuit for detecting a change in an attitude in the y-axis (second detecting axis) direction of the mass 13 by using the capacitors 1A through 4A, 1B through 4B, and other is a mode constituting the y-axis detecting circuit for detecting a change in the attitude in the x-axis (first detecting axis) direction of the mass 13 by using the capacitors 1A through 4A, 1B through 4B.

In details, when the switching circuit 106 is connected to one contact, a capacitor group (capacitors 2A, 3A, 1B, 4B) having the same direction (tendency) of the changes in the electrostatic capacitances in changing the attitude of the y-axis direction of the mass 13 are connected in parallel, similarly, a capacitor group (capacitors 1A, 4A, 2B, 3B) having the same direction (tendency) of the changes in the electrostatic capacitances in changing the attitude in the y-axis direction of the mass 13 are connected in parallel. The capacitor groups are connected in series. A connecting point in the series connection is connected to the input terminal of the current/voltage converting circuit 110 (operational amplifier ICI).

During a time period of connecting the switching circuits 106 in this way, the two-axis detecting circuit 107 functions as an x-axis detecting circuit for detecting a change in the attitude of the mass 13 by an angular velocity operated around the first detecting axis (x-axis).

In the angular velocity sensor according to the embodiment, during a time period in which the two-axis detecting circuit 107 functions as the x-axis detecting circuit, that is, during a time period in which the capacitors having the same direction (tendency) of the changes in the electrostatic capacitances in changing the attitude in the y-axis direction of the mass 13 are connected in parallel, further, the capacitors in which the directions (tendencies) of the changes in the electrostatic capacitances in changing the attitude in the y-axis direction of the mass 13 are symmetrical are connected in series, a detection sensitivity of the sensor becomes a sum of electrode sensitivities of all of the capacitors 1A through 4A, 1B, through 4B.

That is, in the angular velocity sensor according to the embodiment, there is constructed a constitution of detecting the angular velocity operated around the first detecting axis (x-axis) of the mass 13 by using all of the fixed electrodes 21 through 24, 31 through 34.

Similarly, when the switching circuits 106 are connected to other contact, a capacitor group (capacitors 1A, 2A, 3B, 4B) having the same direction (tendency) of the changes in the electrostatic capacitances in changing the attitude in the x-axis direction of the mass 13 are connected in parallel, similarly, a capacitor group (capacitors 3A, 4A, 1B, 2B) having the direction (tendency) of the changes in the electrostatic capacitances in changing the attitudes in the x-axis direction of the mass 13 are connected in parallel. The capacitor groups are connected in series. A connecting point in the series connection is connected to the input terminal of the current/voltage converting circuit 110 (operational amplifier IC1).

During a time period of connecting the switching circuits 106 in this way, the two-axis detecting circuit 107 functions as a y-axis detecting circuit for detecting the change in the attitude of the mass 13 by an angular velocity operated around the second detecting axis (y-axis).

In the angular velocity sensor according to the embodiment, during a time period in which the two-axis detecting circuit 107 functions as the y-axis detecting circuit, that is, during a time period in which the capacitors having the same direction (tendency) of the changes in the electrostatic capacitances in changing the attitude in the x-axis direction of the mass 13 are connected in parallel, further, the capacitors in which the direction (tendency) of the changes in the electrostatic capacitances in changing the attitude in the x-axis direction of the mass 13 are symmetrical are connected in series, the detection sensitivity of the sensor becomes the sum of the electrode sensitivities of all of the capacitors 1A through 4A, 1B through 4B.

That is, in the angular velocity sensor according to the embodiment, there is constructed a constitution of detecting the angular velocity operated around the second detecting axis (y-axis) of the mass 13 by using all of the fixed electrodes 21 through 24, 31 through 34.

In this way, in the angular velocity sensor according to the embodiment, there is constructed a constitution in which by switching the wire connecting states of the capacitors 1A through 4A, 1B through 4B by the switching circuits 106, the two-axis detecting circuit 107 can be made to function as the x-axis detecting circuit for detecting the change in the attitude in the y-axis (second detecting axis) direction of the mass 13, or can be made to function as the y-axis detecting circuit for detecting the change in the attitude in the x-axis (first detecting axis) direction of the mass 13.

The two-axis detecting circuit 107 is constituted such that during the time period in which the two-axis detecting circuit 107 functions as the x-axis detecting circuit or the y-axis detecting circuit, both ends of the respective circuits, that is, both ends of the capacitors connected in series are applied with carrier waves phases of which are inverted from each other by 180°.

The z-axis detecting circuit 109 is constituted by a circuit connecting the capacitor ZA constituted by the fixed electrode 20 (FIG. 3) provided at the upper glass board 2 and the movable electrode and a previously set capacitor Zr for reference in series.

The z-axis detecting circuit 109 is constituted such that both ends of the z-axis detecting circuit 109, that is, both of ends of the capacitors connected in series are applied with carrier waves phases of which are shifted from each other by 180°.

The phase of the carrier wave applied to the two-axis detecting circuit 107 is brought into the state of being shifted from the phase of the carrier wave applied to the z-axis detecting circuit 109 by 90° since the phase of the carrier wave generated at the alternating current voltage source 101 is forcibly shifted by 90° by the 90° phase shifter 103.

A switching operation of contacts of the switching circuit 106, that is, a switching operation of a circuit branch point of the switching circuit 106 is constituted to be carried out based on a timing (clock signal C1') of the specific control clock generated by the control clock generating circuit 102.

In this way, the switching circuit 106 is provided with a function of constituting the two-axis detecting circuit 107 by the x-axis detecting circuit and the y-axis detecting circuit alternately at a constant period, that is, a function of switching wirings (wiring connections) of the capacitors 1A through 4A, 1B through 4B) and is constituted by, for example, an analog switch or the like.

As shown by FIG. 4, the point of connecting the capacitors in series in the two-axis detecting circuit 107 is connected to the current/voltage converting circuit 110.

When carrier waves are applied to the two-axis detecting circuit 107 and the z-axis detecting circuit 109, from the points of connecting the capacitors of the respective detecting circuits in series, current signals indicating differences in the electrostatic capacitances of the both capacitors connected in series are inputted to the current/voltage converting circuit 110.

The current/voltage converting circuit 110 includes the operational amplifier IC1 and a resistor Rf.

The current signals outputted from the respective detecting circuits are connected to an inverted input terminal (−) of the operational amplifier IC1. A noninverted terminal (+) of the operational amplifier IC1 is connected (grounded) to ground potential.

The resistor Rf functioning as a feedback resistance is connected between an output terminal and the inverted input terminal (−) of the operational amplifier IC1.

The operational amplifier IC1 is constituted by an operational amplifier constituting an analog integrating circuit.

The inverted input terminal (−) of the operational amplifier IC1 is a terminal at which a signal inputted thereto is inverted and amplified to be outputted. On the other hand, the noninverted input terminal (+) is a terminal at which a signal inputted thereto is amplified without being inverted to be outputted.

A gain of the operational amplifier is extremely high, and also with regard to a range of a frequency characteristic, a direct current through several MHz can be amplified.

Although not illustrated, the operational amplifier IC1 is provided with a terminal of a power source and is supplied with a power for operation from the terminal.

The output terminal of the operational amplifier IC1 is connected to HPF (high pass filter) 111. HPF 111 is a filter circuit for passing a frequency component of the carrier wave generated by the alternating current voltage source 101 and cutting a signal of a frequency component lower than the above-described component in the output signal of the operational amplifier IC1.

An output of HPF 111 is connected to be inputted respectively to synchronous detection circuits, 112, 113, 114.

The synchronous detection circuit 112 is constituted by a processing circuit for extracting (separating) an x-axis detecting signal (Vdx) based on a signal component detected during a time period in which the two-axis detecting circuit 107 functions as the x-axis detecting circuit.

The synchronous detection circuit 113 is constituted by a processing circuit for extracting (separating) a y-axis detecting signal (Vdy) based on a signal component detected during a time period in which the two-axis detecting circuit 107 functions as the y-axis detecting circuit.

The synchronous detection circuit 114 is constituted by a processing circuit for extracting (separating) a z-axis detecting signal (Vdz) based on a signal component detected by the z-axis detecting circuit 109.

Respective outputs of the synchronous detection circuits 112 through 114 are connected to LPF (lowpass filter) 115 through 117. LPF 115 through 117 are constituted by smoothing circuits for smoothing output signals of the synchronous detection circuits 112 through 114.

The C/V converting circuit 100 is constituted such that a signal (Vlpfx signal) smoothed by LPF 115 is subjected to a predetermined amplifying processing by an amplifying circuit 118 and thereafter, outputted to the X-axis angular velocity detecting circuit 200 as an x-axis C/V output signal.

Similarly, the C/V converting circuit 100 is constituted such that a signal (Vlpfy signal) smoothed by LPF 116 is subjected to a predetermined amplifying processing by an amplifying circuit 119 and thereafter, outputted to the Y-axis angular velocity detecting circuit 300 as a y-axis C/V output signal.

The C/V converting circuit 100 is constituted such that a signal (Vlpfz signal) smoothed by LPF 117 is subjected to a predetermined amplifying processing by an amplifying circuit 120, and thereafter, outputted to an AGC (automatic gain control) circuit/phase adjusting circuit 121.

A signal processed by the AGC circuit/phase adjusting circuit 121 is outputted to an electrostatically driving circuit 122.

The AGC circuit/phase adjusting circuit 121 and the electrostatically driving circuit 122 are control circuits for driving the primary oscillation of the z-axis of the mass 13 by a self-excited oscillation, and by a signal processed by the circuits, there is adjusted a drive control voltage applied to a previously set capacitor Zd for reference connected to the electrostatically driving circuit 122, and the capacitor ZB constituted by the drive electrode 30 (FIG. 3) provided at the lower glass board 3 and the movable electrode.

According to the X-axis angular velocity detecting circuit 200, after cutting a high frequency component of a signal outputted from the amplifying circuit 118 as the x-axis CV output circuit by HPF 201, the signal is subjected to a specific detection processing by a synchronous detection circuit 202 based on a signal constituted by shifting a phase of a reference signal outputted from the AGC circuit/phase adjusting circuit 121 by a phase shifter 205.

After subjecting the signal to a smoothing processing by LPF 203, the signal is subjected to an amplifying processing at AMP (amplifying circuit) 204 to be outputted from the angular velocity sensor as an x-axis angular velocity output signal.

Similarly, according to the Y-axis angular velocity detecting circuit 300, after cutting a high frequency component of a signal outputted from the amplifying circuit 119 as the y-axis CV output circuit by HPF 301, the signal is subjected to a specific detection processing by a synchronous detection circuit 302 based on a signal constituted by shifting a phase of the reference signal outputted from the AGC circuit/phase adjusting circuit 121 by a phase shifter 305.

After subjecting the signal to a smoothing processing by LPF 303, the signal is subjected to an amplifying processing by AMP 304 to be outputted from the angular velocity sensor as a y-axis angular velocity output signal.

Next, an explanation will be given of a procedure of a signal processing executed by the C/V converting circuit 100.

FIG. 5 is a time chart showing signal waveforms of respective portions of the C/V converting circuit 100.

The signal processing of the C/V converting circuit 100 is executed based on a period (frequency) of a V0 signal generated by the alternating current voltage source 101 shown in FIG. 5A.

When the V0 signal is applied to the capacitor ZA and a signal constituted by inverting a phase of the V0 signal by 180° (V0 inverting signal) is applied to the capacitor Zr, a current Iz (current signal) shown by FIG. 5B is inputted from the z-axis detecting circuit 109 to the current/voltage converting circuit 110.

When the V0 signal is made to pass the 90° phase shifter 103, the phase is shifted by 90° to constitute V1 signal (carrier signal) as shown by FIG. 5D.

In the angular velocity sensor according to the embodiment, the V1 signal shown in FIG. 5D is applied to the capacitor 1A and the capacitor 3B, and a V1' signal (inverted signal of V1 signal) shown in FIG. 5E is applied to the capacitor 3A and the capacitor 1B.

The V1 signal and the V1' signal are switched to be applied to the capacitors 2A, 4B and the capacitors 4A, 2B alternately by time division in synchronism with timings of switching the connections by the switching circuits 106.

For example, during a time period of time TX shown in FIG. 5, that is, there is a time period in which the two-axis detecting circuit 107 functions as the x-axis detecting Circuit, the capacitors 1A, 2A, 3B, 4B are applied with the V1 signal and the capacitors 3A, 4A, 1B, 2B are applied with the V1' signal. In this way, during the time period of time TX, there is constituted a combination of the electrodes of the differential capacitance detecting system having sensitivity in the angular velocity operated around the x-axis.

During the time period of time TX, the V1 signal becomes equal to a V2 signal shown in FIG. 5F, and the V1' signal becomes equal to a V3 signal shown in FIG. 5G.

The V1 signal, the V1' signal, the V2 signal, the V3 signal respectively indicate voltage signals at points V1, V1', V2, V3 shown in FIG. 4.

Currents I1, I2, I3 shown in FIGS. 5H, 5I, 5J respectively show carrier currents at points V1, V2, V3 shown in FIG. 4.

Similarly, during a time period of time TY shown in FIG. 5, that is, during the time period in which the two-axis detecting circuit 107 functions as the y-axis detecting circuit, the capacitors 1A, 4A, 2B, 3B are applied with the V1 signal and the capacitors 2A, 3A, 1B, 4B are applied with the V1' signal. In this way, during the time period of time TY, there is constituted a combination of the electrodes of the differential capacitance detecting system having sensitivity in the angular velocity operated around the y-axis.

During the time period of time TY, the V1 signal becomes equal to the V3 signal and the V1' signal becomes equal to the V2 signal.

In the angular velocity sensor according to the embodiment, when attention is paid to two sets of capacitors (fixed electrodes) applied with the V1 signal and the V2 signal or the V1 signal and the V3 signal, when the signals are in the same phase, as shown by FIGS. 5K, 5M, sums of the carrier currents, that is, the current I1+the current I2, and the current I1+the current I3 are provided with double amplitudes. Thereby, the angular velocity sensor can be provided with a double sensitivity.

The current I1+the current I2 shown in FIG. 5K indicates a detecting current Ix when the two-axis detecting circuit 107 functions as the x-axis detecting circuit, and I1+I3 shown in FIG. 5M indicates a detecting current Iy when the two-axis detecting circuit 107 functions as the y-axis detecting circuit.

The detecting currents Ix, Iy are inputted from the two-axis detecting circuit 107 to the current/voltage converting circuit 110.

A timing of switching the connecting point of the switching circuit 106 is carried out based on the clock signal C1' mentioned later.

When the currents Ix, Iy, Iz are inputted to IC1, the current/voltage converting circuit 110 carries out a processing of converting the currents into voltage values in proportion thereto.

The current/voltage converting circuit 110 outputs a synthesized signal (Vout signal) constituted by summing up a Vxout signal indicated in FIG. 5L constituted by converting the current Ix into a voltage, a Vyout signal shown in FIG. 5N constituted by converting the current Iy into a voltage, and a Vzout signal shown in FIG. 5C constituted by converting the current Iz into a voltage.

The synchronous detection circuits 112 through 114 execute processing of extracting and separating detecting signals of components of respective axes from the Vout signal based on various clock signals generated by the control clock generating circuit 102.

In the control clock generating circuit 102, clock signals C1, C0, C1', C0' are generated.

As shown by FIG. 5O, the clock signal C1 is a signal of generating a pulse during a positive (+) time period of the V1 signal.

As shown by FIG. 5P, the clock signal C0 is a signal constituted by shifting a phase of the clock signal C1 by 90°.

As shown by FIG. 5Q, the clock signal C1' is a signal constituted by doubling the period of the clock signal C1, that is, halving a frequency thereof.

As shown by FIG. 5R, the clock signal C0' is a signal constituted by inverting a phase of the clock signal C1' by 180°.

In the synchronous detection circuit 112, a clock signal C is generated.

The clock signal C is a signal for subjecting the Vxout signal into synchronous detection, and is a signal providing a time period of making the clock signal C0 ON only in a time period of making the clock signal C1' ON as shown by FIG. 5S.

In the synchronous detection circuit 113, a clock signal C' is generated.

The clock signal C' is a signal for subjecting the Vyout signal to synchronous detection and a signal providing a time period of making the clock signal C0 ON only in a time period of making the clock signal C0' ON as shown in FIG. 5T.

In the synchronous detection circuits 112 through 114, first, there is carried out a processing of separating the Vzout signal by a phase division system for the Vout signal.

Here, the processing of separating the signal by a phase division system is explained.

Figure 7A:
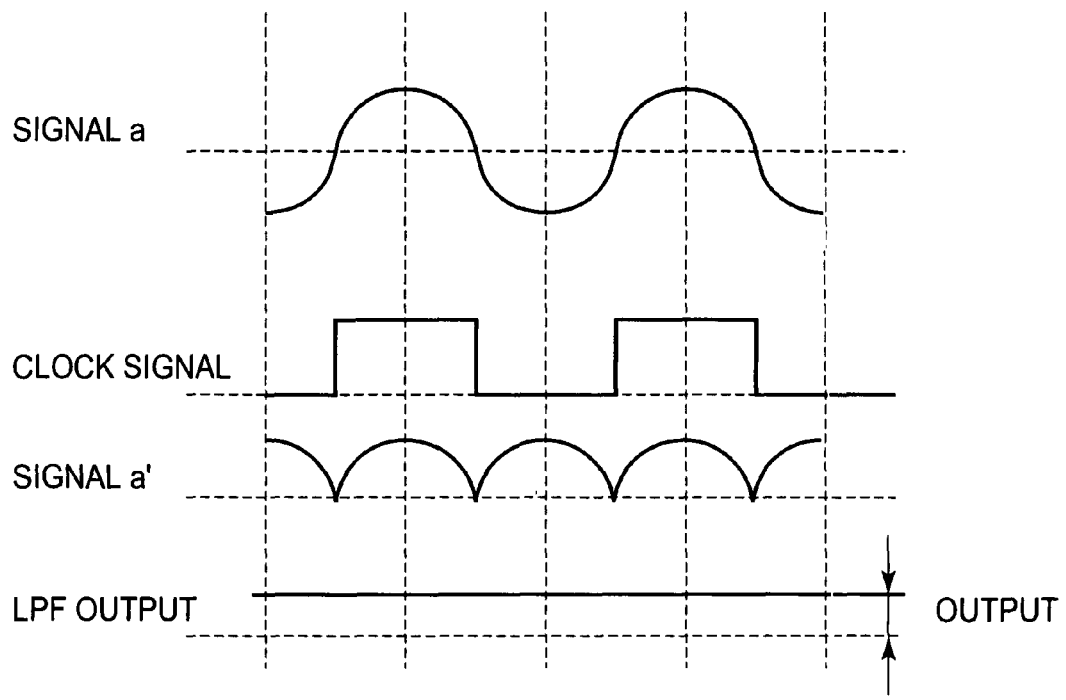
FIGS. 7A and 7B are diagrams for explaining a phase division system.
Figure 7B:
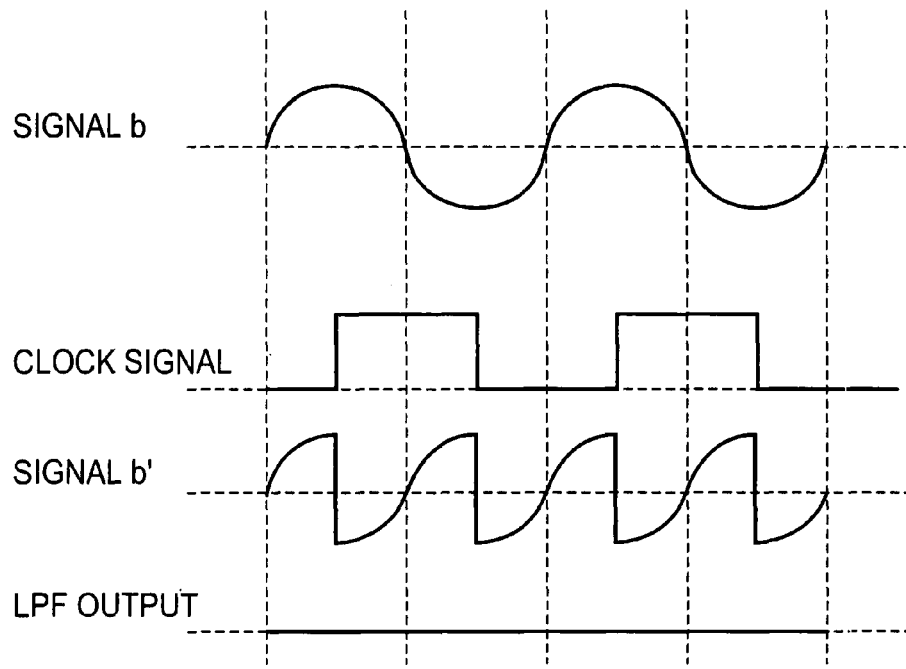

FIGS. 7A and 7B are diagrams for explaining the phase division system.

For example, as shown by FIG. 7A, when by using a clock signal generating a pulse during a positive (+) time period of a sine wave signal (signal a) constituting an object of processing, the signal a is rectified only at an OFF time period (Low time period) of the clock signal, a signal a' is provided.

By subjecting the signal a' to a smoothing processing by using LPF, a direct current output in accordance with an amplitude (magnitude) of the signal a can be provided.

On the other hand, as shown by FIG. 7B, when a sine wave signal (signal b) a phase of which is shifted from that of the signal a by 90° is rectified only at the OFF time period (Low time period) of the clock signal, a signal b' is provided.

When the signal b' is subjected to a smoothing processing by using LPF, a positive (+) component and a negative (−) component of the signal b' are canceled by each other, and therefore, the direct current output becomes 0 (null).

That is, by subjecting a synthesized signal including the signal a and the signal b the phases of which are shifted from each other by 90° to a rectifying processing by using the same clock signal and smoothing an output thereof, only the direct current output in correspondence with a magnitude of one signal (signal a in this case) can be provided. A system of splitting (dividing) signals in this way is referred to as the phase division system.

By using the above-described phase division system, in the synchronous detection circuit 112, a processing of rectifying the Vout signal is carried out by using the clock signal C0, and a processing of removing a component of the Vzout signal from the Vout signal is carried out.

According to the embodiment, the smoothing processing after having been rectified is executed by LPF 115 through 117 provided at post stages of the synchronous detection circuits 112 through 114. However, in order to avoid complication of the explanation, with regard to signal components finally removed after passing LPF 115 through 117, an explanation will be given in a state of being previously removed.

Successively, in the synchronous detection circuit 112, a processing of separating the Vxout signal and the Vyout signal by a time division system is carried out for a Vout' signal after removing the Vzout signal component.

In details, in synchronism with a timing of operating the switching circuits 106, by using the clock signal C, there is carried out a processing of detecting (extracting) a signal only at a timing (time period) of the Vout' signal in which the two-axis detecting circuit 107 functions as the x-axis detecting circuit.

Thereby, the component of the Vyout signal outputted from the current/voltage converting circuit 110 can be removed at the timing (time period) in which the two-axis detecting circuit 107 functions x-axis detecting circuit.

In this way, in the synchronous detection circuit 112, the component of the Vzout signal and the Vyout signal are removed from the Vout signal, that is, only the component of the Vxout signal is extracted.

A Vdx signal shown in FIG. 5U constituted by rectifying the Vxout signal is outputted from the synchronous detection circuit 112.

Similarly, in the synchronous detection circuit 113, a processing of removing the component of the Vzout signal from the Vout signal is carried out by executing a processing of rectifying the Vout signal by using the clock signal C0.

Successively, in the synchronous detection circuit 113, a processing of separating the Vxout signal by the time division system is carried out for the Vout' signal after removing the Vzout signal component.

In details, in synchronism with a timing of operating the switching circuits 106, by using the clock signal C', there is carried out a processing of detecting (extracting) a signal only at a timing (time period) of the Vout' signal in which the two-axis detecting circuit 107 functions as the y-axis detecting circuit.

Thereby, the component of the Vxout signal outputted from the current/voltage converting circuit 110 can be removed at the timing (time period) in which the two-axis detecting circuit 107 functions as the y-axis detecting circuit.

In this way, in the synchronous detection circuit 113, the components of the Vzout signal and the Vxout signal are removed from the Vout signal, that is, only the component of the Vyout signal is extracted.

A Vdy signal shown in FIG. 5W constituted by rectifying the Vyout signal is outputted from the synchronous detection circuit 113.

By using the above-described phase division system, in the synchronous detection circuit 114, the processing of rectifying the Vout signal is carried out by using the clock signal C1, and the processing of removing the components of the Vxout signal and the Vyout signal from the Vout signal is carried out.

In the synchronous detection circuit 114, contrary to the synchronous detection circuits 112, 113, by using the clock signal C0 the phase of which is shifted from the phase of the clock signal C1 by 90°, the component of the Vxout signal and the Vyout signal constituting output signals of the two-axis detecting circuit 107 applied with the carrier wave the phase of which is shifted from the carrier wave applied to the z-axis detecting circuit 109 by 90° can be removed.

A Vdz signal shown in FIG. 5Y constituted by rectifying the Vzout signal is outputted from the synchronous detection circuit 114.

The Vdx signal outputted from the synchronous detection circuit 112 is subjected to a smoothing processing by LPF 115 to constitute a Vlpfx signal shown in FIG. 5V.

Similarly, the Vdy signal outputted from the synchronous detection circuit 113 is subjected to a smoothing processing by LPF 116 to constitute a Vlpfy signal shown in FIG. 5X, and the Vdz signal outputted from the synchronous detection circuit 114 is subjected to a smoothing processing by LPF 117 to constitute a Vlpfz signal shown in FIG. 5Z.

In this way, the detecting voltages (Vdx, Vdy, Vciz) in correspondence with the current signals (Ix, Iy, Iz) of the two-axis detecting circuit 107 and the z-axis detecting circuit 109 summerizingly inputted to the signal current/voltage converting circuit 110 can pertinently be separated for the respective components of axes.

In this way, the angular velocity sensor according to the embodiment is constituted such that the difference (phase difference) between the phase of the carrier wave (carrier) applied to the two-axis detecting circuit 107 and the phase of the carrier waver applied to the z-axis detecting circuit 109 is made to be 90°, further, the carrier waves are applied by alternately switching the two-axis detecting circuit 107 by the switching circuit 106.

Thereby, the detecting component of the z-axis and the detecting components of the x-axis and the y-axis can be separated from the Vout signal constituting the output of the current/voltage converting circuit 110 including the detecting components of all of the axes (x-axis, y-axis, z-axis) by adopting the phase division system and the detecting component of the x-axis the and the detecting component of the y-axis can be separated by adopting the time division system.

In this way, by combining to use the phase division system and the time division system, the three signal components can easily be separated without using a complicated frequency modulating circuit or the like.

As described above, in the angular velocity sensor according to the embodiment, by using all of the fixed electrodes 21 through 24, 31 through 34 provided at the upper glass board 2 and the lower glass board 3, the x-axis direction component (or y-axis direction component) of the operated angular velocity is detected, and therefore, that is, a sensitivity of all of the electrodes can be provided, and therefore, in comparison with the sensor of detecting the x-axis direction component and the y-axis direction component by using independent (exclusive) electrodes as in the related art, the electrode sensitivity can be doubled. That is, the double detection sensitivity (detection accuracy) can be achieved in the sensor arranged with the fixed electrodes having the shape and the number the same as those of the angular velocity sensor of the related art.

According to the embodiment, the detecting component in the respective axis directions for detecting the change in the attitude of the mass 13 are measured based on the changes in the electrostatic capacitance between the fixed electrodes and the movable electrode (mass 13). A result of detecting the displacements in correspondence with the changes in the electrostatic capacitances in the respective axial directions can pertinently be separated for the respective axis components.

Thereby, in the angular velocity sensor according to the embodiment, the change in the attitude of the mass 13 in the x-axis, the y-axis, the z-axis can simultaneously be detected.

In the angular detecting sensor according to the embodiment, the Vxout signal finally outputted as the signal of detecting the x-axis angular velocity and the Vyout signal finally outputted as the signal of detecting the y-axis angular velocity are separated by using the time division system, and therefore, crosstalk (interference with cross axis) by the respective detecting components in the axial directions can be restrained.

In this way, according to the embodiment, in the angular velocity of the two-axis detection type, a circuit capable of restraining crosstalk (interference with cross axis) between two axes having the angular velocity sensitivities and capable of simultaneously detecting the displacement in the direction of vibrating the mass 13 can be constituted by a small number of parts.

According to the embodiment, the Vzout signal outputted as the signal of detecting the change in the mass 13 in the z-axis direction is separated from the Vxout signal and the Vyout signal by using the phase division system, and therefore, when there is brought about a phase shift (delay or advance) by an error of the circuit or an error of accuracy, there is a concern that the Vzout signal constituting the object cannot completely be removed to separate and the component of the Vzout signal superposes on cross-axis component.

However, the Vzout signal is for detecting a shift amount (displacement amount) from a reference position in driving to vibrate the mass 13 and is not provided with the angular velocity sensitivity as in the Vxout signal or the Vyout signal.

Therefore, even when the component of the Vzout signal superposes on the cross-axis component, an influence thereby can be made to be sufficiently small (restrained) in comparison with an influence of crosstalk (interference with cross axis) brought about when axis components of signals having angular velocity sensitivities are separated by using the phase division system.

FIRST MODIFIED EXAMPLE

Next, a first modified example of the above-described angular velocity sensor will be explained.

In the above-described angular velocity sensor (shown in FIG. 4), the two-axis detecting circuit 107 is constituted by using the eight capacitors.

Hence, according to the first modified example, an explanation will be given of an angular velocity sensor of a simplified type in which a two-axis detecting circuit 128 is constituted by using four of the capacitors 1A through 4A comprising the fixed electrodes provided at the upper glass board 2 and the movable electrode (mass 13).

That is, an explanation will be given here of the angular velocity sensor constituting a two-axis detecting circuit 128 by using the fixed electrodes 21 through 24 of a number of a half of a number of the fixed electrodes of the above-described angular velocity sensor.

FIG. 6 is a circuit block diagram showing a C/V converting circuit of the angular velocity sensor shown in the first modified example.

Portions the same as those of the constitution of the above-described angular velocity sensor are attached with the same notations, a detailed explanation thereof will be omitted and portions which differ from those of the constitution of the above-described angular velocity sensor will be explained.

As shown by FIG. 6, the two-axis detecting circuit 128 is constituted by the capacitors 1A through 4A one ends of which are connected to the same point (input point of current/voltage converting circuit 110).

The point previously connected with the one ends of the capacitors 1A through 4A is referred to as a common point.

By using a pair of switching circuits 126 being operated in synchronism with the clock signal C1', the connecting points of other end sides of the capacitors 1A through 4A are switched.

The connecting points of the other end sides of the capacitors 1A through 4A are made to constitute varying ends.

During the time period in which the clock signal C1' is made ON, the two-axis detecting circuit 128 is made to function as the x-axis detecting circuit and is brought into a connected state constituting the detecting circuit for detecting the displacement around the x-axis. On the other hand, during the time period in which the clock signal C1' is made OFF, there constructed a constitution in which the connecting points of the switching circuits 126 are switched such that the two-axis detecting circuit 128 is made to function as the y-axis detecting circuit and is brought into a connected state constituting the detecting circuit for detecting the displacement around the y-axis.

In details, during the time period in which the clock signal C1' is made ON, the varying ends of the capacitor 1A and the capacitor 4A are connected, the varying ends of the capacitor 2A and the capacitor 3A are connected, and the carrier waves are applied from the respective connecting ends.

The current signals indicating the differences of the electrostatic capacitances of the capacitors connected in series are inputted from the common point of the two-axis detecting circuit 128 to the current/voltage converting circuit 110, and the Vxout signal constituting the detecting signal of the angular velocity sensitivity of the x-axis is generated.

On the other hand, during the time period in which the clock signal C1' is made OFF, the varying ends of the capacitor 1A and the capacitor 2A are connected, the varying ends of the capacitor 4A and the capacitor 3A are connected, and the carrier wavers are applied from the respective connecting ends.

The current signals indicating the difference of the electrostatic capacitances of the capacitors connected in series are inputted from the common point of the two-axis detecting circuit 128 to the current/voltage converting circuit 110, and the Vyout signal constituting the detecting signal of the angular velocity sensitivity of the y-axis is generated.

Also in the first modified example of the angular velocity sensor, the four capacitors 1A through 4A constituting the two-axis detecting circuit 128 can be used both for detecting the displacement in the x-axis direction and detecting the displacement in the y-axis direction. That is, the two-axis detecting circuit 128 is made to be able to be provided with the function of the x-axis detecting circuit and the function of the y-axis detecting circuit.

Even in the angular velocity sensor shown in the first modified example, during the time period in which the two-axis detecting circuit 107 is made to function as the x-axis detecting circuit, that is, during the time period in which the capacitors in which the directions (tendencies) of the changes in the electrostatic capacitance in changing the attitude in the x-axis direction of the mass 13 become the same are connected in parallel, further, the capacitors in which the directions (tendencies) of the changes in the electrostatic capacitances in changing the attitude in the x-axis direction of the mass 13 becomes symmetrical are connected in series, the detection sensitivity of the sensor becomes a sum of the electrosensitivities of all of the capacitors 1A through 4A.

That is, also in the angular velocity sensor shown in the first modified example, there is constructed a constitution in which by using all of the fixed electrodes 21 through 24, the angular velocity operated around the first detecting axis (x-axis) of the mass 13 and the angular velocity operated around the second detecting axis (y-axis) thereof are detected.

Also in the angular velocity sensor shown in the first modified example, the x-axis direction component (or y-axis direction component) of the operated angular velocity is detected by using all of the fixed electrodes 21 through 24 provided at the upper glass board 2, and therefore, that is, all of the electrode sensitivities are provided, and therefore, the electrode sensitivities can be doubled in comparison with a sensor for detecting the x-axis direction component and the y-axis direction component by using the independent (exclusive) electrodes as in the related art. That is, in a sensor arranged with the fixed electrodes having a shape and a number the same as those of the angular velocity sensor of the related art, the double detection sensitivity (detection accuracy) can be achieved.

Further, since according to the angular velocity sensor shown in the first modified example, the fixed electrodes are constituted to arrange at the one face, that is, since one face electrode system is used, a degree of freedom of sensor design can be promoted such that small-sized formation is achieved, or the large drive electrodes are provided by using other face.

SECOND MODIFIED EXAMPLE

Next, a second modified example of the above-described angular velocity sensor will be explained.

According to the second modified example, an explanation will be given of an angular velocity sensor for detecting the displacements in the three axes (x-axis, y-axis, z-axis) directions of a mass 13 by utilizing only the time division system.

Further, here, portions the same as those of the constitution of the above-described angular velocity sensor are attached with the same notations, a detailed explanation thereof will be omitted, and portions which differ from those of the above-described angular velocity sensor will be explained.

In the angular velocity sensor shown in the second modified example, there is not provided the fixed electrode 20 for detecting the displacement in the z-axis direction of the mass 13 independently provided in the above-described embodiment and the first modified example.

In place thereof, there is constructed a constitution in which the fixed electrodes provided for detecting the displacements in the x-axis, y axis directions of the mass 13 are used also for the electrode for detecting in the z-axis direction of the mass 13.

Figure 8:
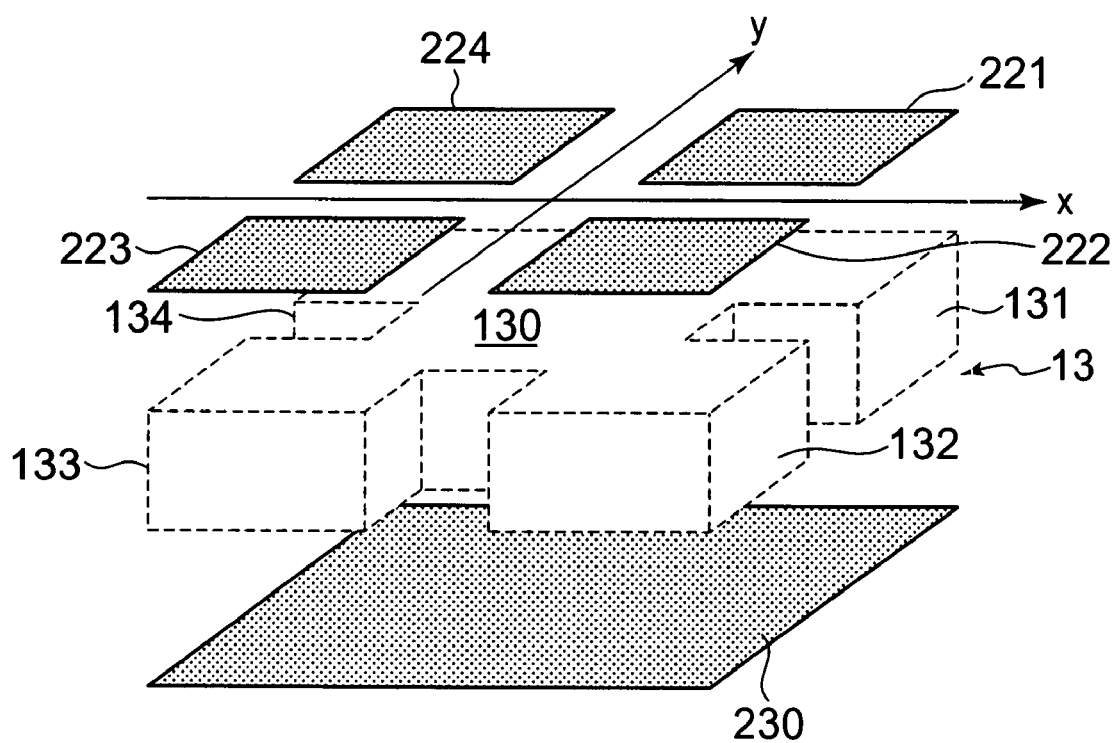
FIG. 8 is a view showing a state of arranging a fixed electrode and a drive electrode provided in an angular velocity sensor shown in a second modified example.

FIG. 8 is a view showing a state of arranging fixed electrodes 221 through 224 and a drive electrode 230 provided in the angular velocity sensor shown in the second modified example.

Further, in FIG. 8, only the electrodes and the mass 13 are shown in order to clearly show a relationship of arranging the respective electrodes of the mass 13.

According to the angular velocity sensor of the second modified example, as shown by FIG. 8, the upper glass board 2 is provided with the fixed electrode 221 at a portion opposed to the mass portion 131, the fixed electrode 222 at a portion opposed to the mass portion 132, the fixed electrode 223 at a portion opposed to the mass portion 133, and the fixed electrode 224 at a portion opposed to the mass portion 134.

On the other hand, the lower glass board 3 is provided with the drive electrode 230 in a square shape at a portion opposed to the mass 13.

The capacitors 1A through 4A are constituted by the fixed electrodes 221 through 224 provided at the upper glass board 2 and the movable electrode (mass 13), and the capacitor ZB is constituted by the drive electrode 230 provided at the lower glass board 3 and the movable electrode (mass 13).

According to the angular velocity sensor shown in the second modified example, there is constructed a constitution of providing the fixed electrodes 221 through 224 for detecting the change in the attitude of the mass 13 only at the upper glass board 2. Therefore, the lower glass board 3 can be provided with the large (wide) drive electrode 230 without being restricted by other electrode.

Thereby, an effective area of the drive electrode 230 can further widely be ensured, and therefore, the amplitude of vibrating the mass 13 can be enlarged, and the detection accuracy of the angular velocity sensor can be promoted.

Figure 9A:
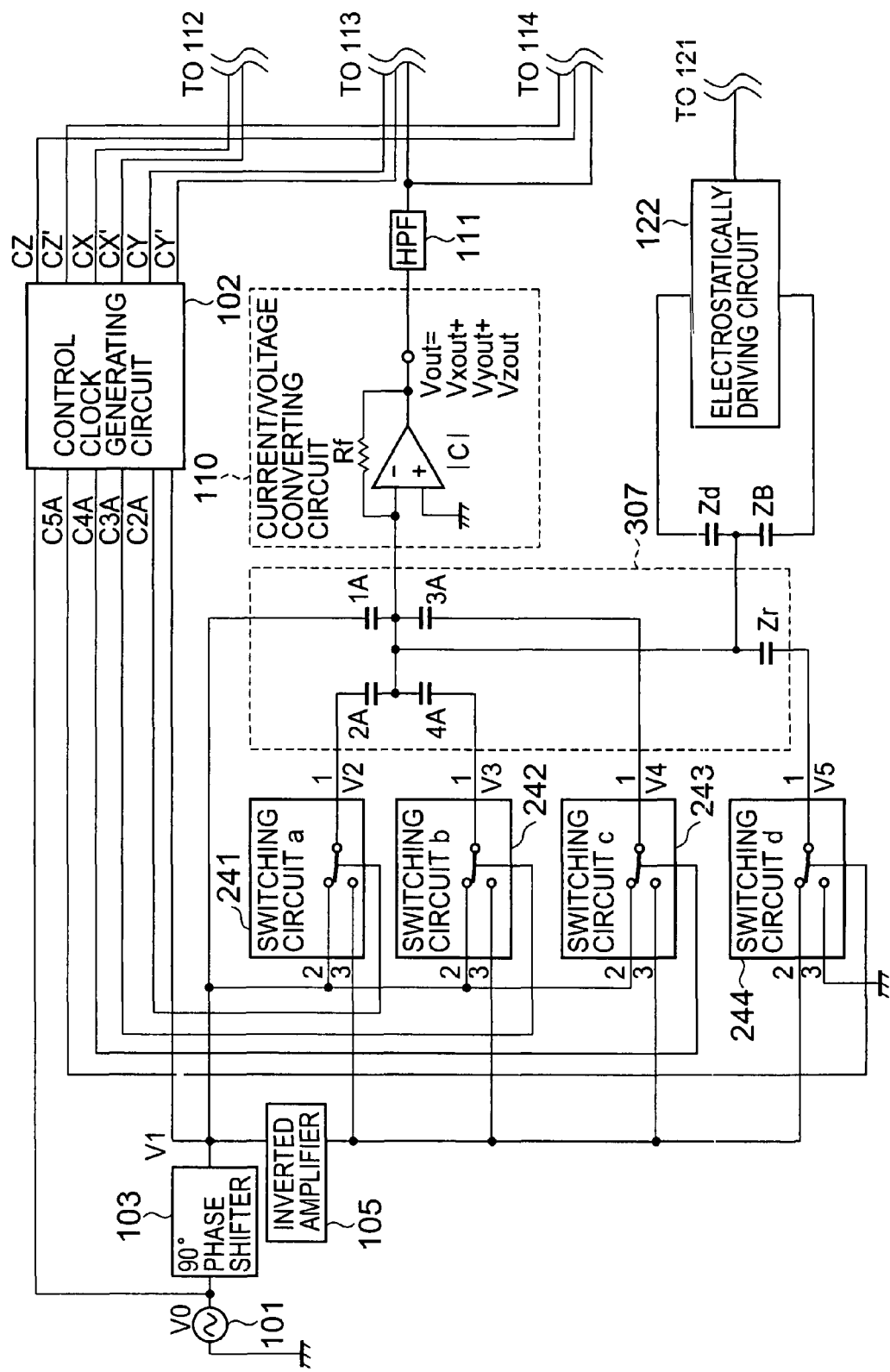
FIG. 9 is a circuit block diagram showing a C/V converting circuit in the angular velocity sensor shown in the second modified example.
Figure 9B:
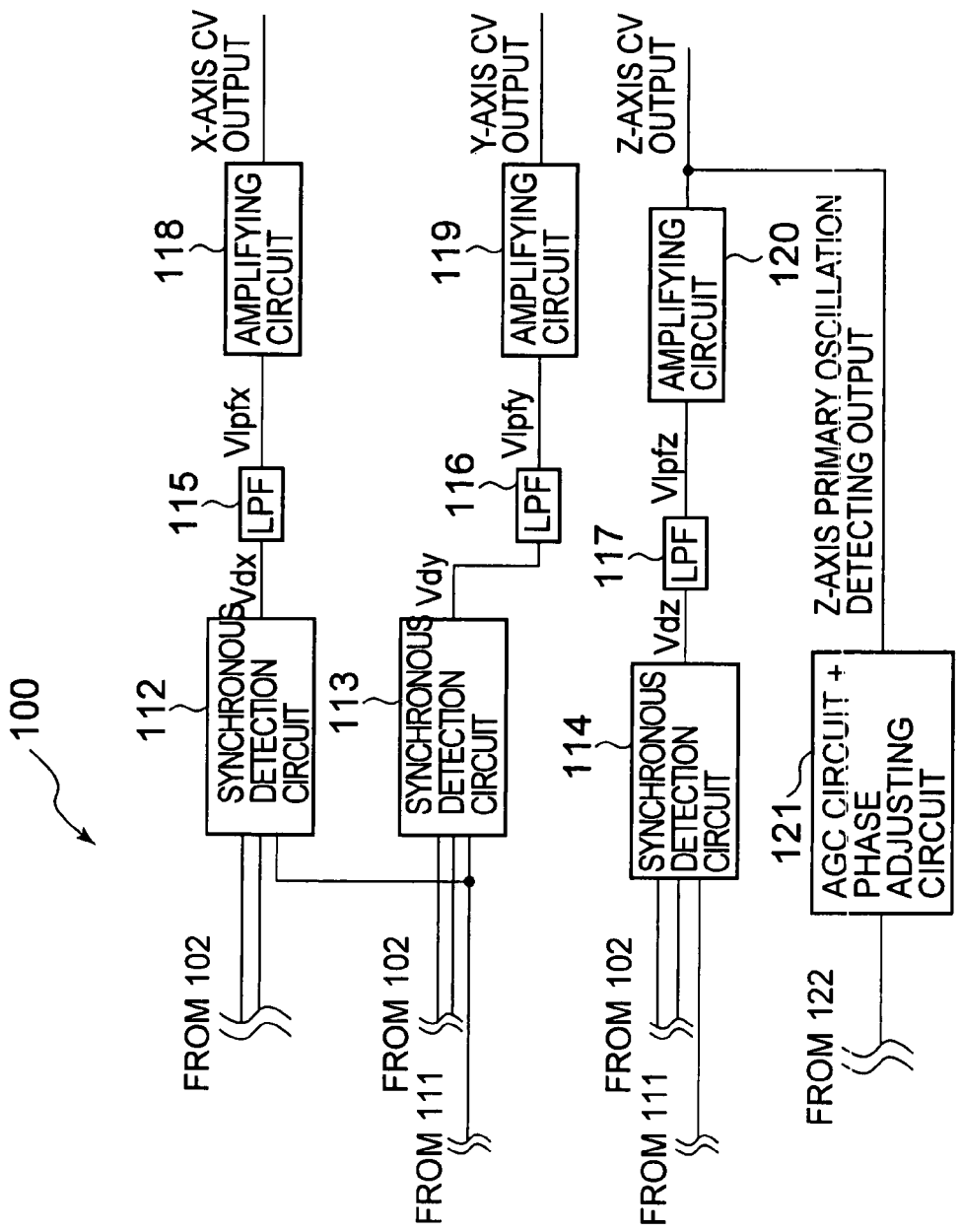

FIG. 9 is a circuit block diagram showing the C/V converting circuit 100 in the angular velocity sensor shown in the second modified example.

Further, portions the same as those of the constitution of the above-described angular sensor are attached with the same notations, a detailed explanation thereof will be omitted, and portions which differ from those of the above-described angular velocity sensor will be explained.

The angular velocity sensor shown in the second modified example is provided with a three axes detecting circuit 307 having all of (serving also as) the functions of the x-axis detecting circuit, the y-axis detecting circuit and the z-axis detecting circuit.

Further, the angular velocity sensor shown in the second modified example is provided with four of changeover switches for switching wire connecting states of the three axes detecting circuit 307, in details, a switching circuit a241, a switching circuit b242, a switching circuit c243, and a switching circuit d244.

The three axes detecting circuit 307 is constituted by the capacitors 1A through 4A, one ends of which are connected to the same point (input point of the current/voltage converting circuit 110), and the capacitor Zr.

Here, the point previously connected (fixed) with the one ends of the capacitors 1A through 4A, Zr is made to constitute a common point, further, connecting points on other end sides of the respective capacitors 1A through 4A, Zr are made to constitute varying ends.

Further, the capacitor Zr is made to function as a capacitor for reference used in detecting in the z-axis direction of the mass 13.

Therefore, an electrostatic capacity of the capacitor Zr in an initial state (state in which a change in an attitude of the mass 13 is not brought about) is constituted to be equal to a total sum of the electrostatic capacitances of the capacitors 1A through 4A.

For example, in the initial state, when an interval between the drive electrode 230 and the mass 13 and an interval between the fixed electrodes 221 through 224 and the mass 13 are set to be equal, an area of the drive electrode 230 is constituted to be equal to a total sum of areas of the fixed electrodes 221 through 224.

The switching circuit a241, the switching circuit b242, the switching circuit c243, the switching circuit d244 each is a three terminals type switch constituting a fixed end by a first terminal and constituting switching ends by a second terminal and a third terminal.

The first terminal of the switching circuit a241 is connected to the varying end of the capacitor 2A, that is, the fixed electrode 222.

The second terminal of the switching circuit a241 is connected to an output end outputting a carrier wave a phase of which is shifted by 90° (hereinafter, referred to an output end of carrier wave), that is, an output line of the 90° phase shifter 103, and the third terminal is connected to an output end of a carrier wave a phase of which is inverted (hereinafter, referred to as inverted carrier wave), that is, an output end of the inverted amplifier 105.

According to the switching circuit b242, the first terminal is connected to the varying end of the capacitor 4A (fixed electrode 224), the second terminal is connected to the output end of the carrier wave, and the third terminal is connected to the output end of the inverted carrier wave.

According to the switching circuit c243, the first terminal is connected to the varying end of the capacitor 3A (fixed electrode 223), the second terminal is connected to the output end of the carrier wave, and the third terminal is connected to the output end of the inverted carrier wave.

According to the switching circuit d244, the first terminal is connected to the varying end of the capacitor Zr (drive electrode 230), the second terminal is connected to the output end of the inverted carrier wave, and the third terminal is connected to a ground terminal. The ground terminal indicates a terminal constituting an earth (ground) potential of the angular velocity sensor.

According to the angular velocity sensor shown in the second modified example, the connecting points of the switching circuit a241, the switching circuit b242, the switching circuit c243, the switching circuit d244 are switched based on predetermined switching signals C2A, C3A, C4A, C5A generated at the control clock generating circuit 102.

Thereby, the wire connecting states of the three axes detecting circuit 307, that is, connecting states of the capacitors 1A through 4A, Zr are switched.

According to the angular velocity sensor shown in the second modified example, by switching the connecting state (wire connecting state) of the three axes detecting circuit 307, setting to a mode constituting the x-axis detecting circuit 307 for detecting the change in the attitude in the x-axis direction of the mass 13 (x-axis detecting mode), a mode constituting the y-axis detecting circuit for detecting the change in the attitude in the y-axis direction of the mass 13 (y-axis detecting mode), a mode constituting the z-axis detecting circuit for detecting the change in the attitude in the z-axis direction of the mass 13 (z-axis detecting mode) can be switched.

According to the angular velocity sensor shown in the second modified example, the switching of the detecting modes is repeatedly carried out in an order of x-axis detecting mode→y-axis detecting mode→z-axis detecting mode.

Next, a detailed explanation will be given of a method of switching the detecting modes in the angular velocity sensor shown in the second modified example.

FIG. 10 is a table showing a relationship between a connecting state of the switching circuit and the constituted detecting mode of the three axes detecting circuit 307 in the angular velocity sensor shown in the second modified example.

Figure 11A:
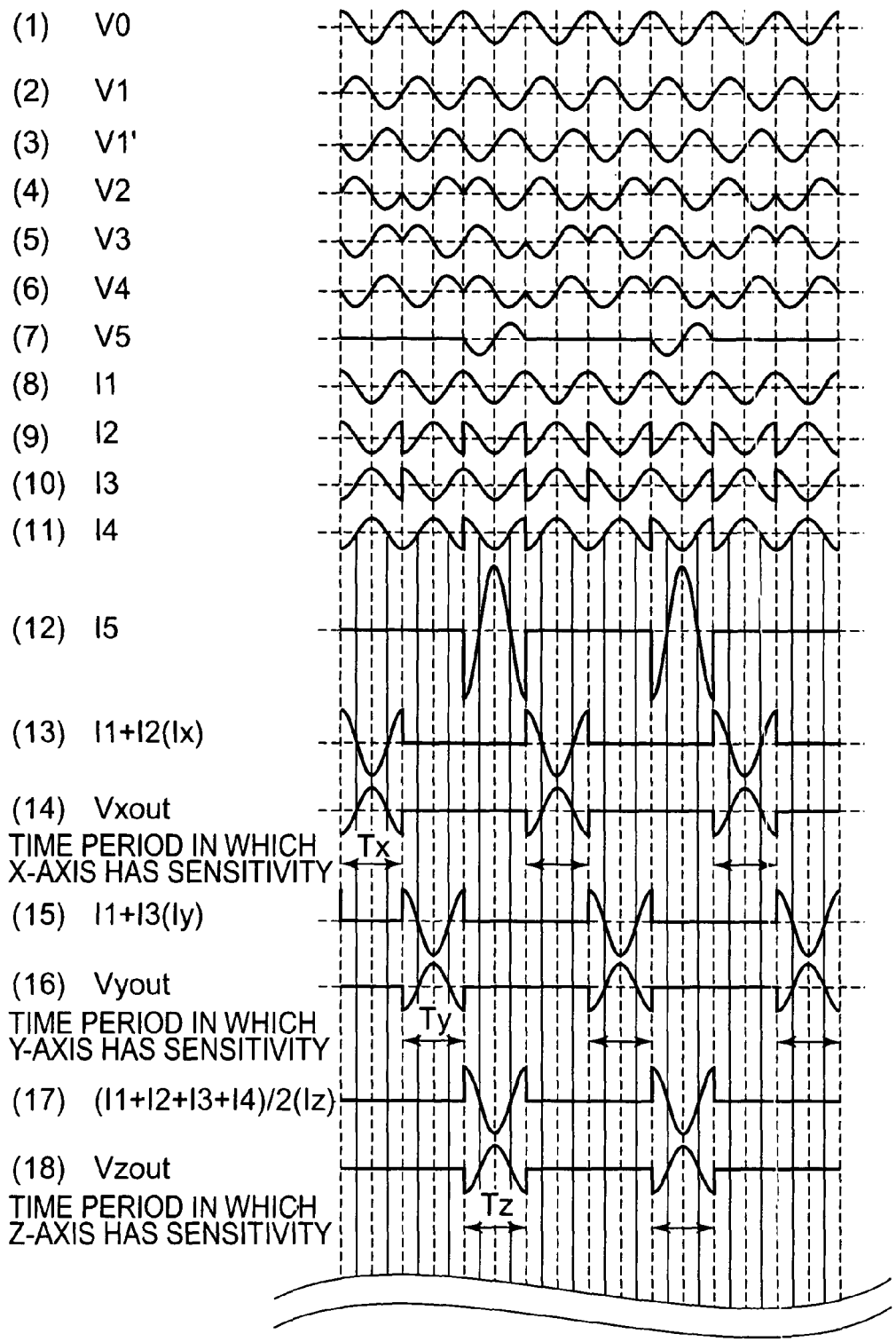
FIG. 11 is a time chart showing signal waveforms of respective portions in the C/V converting circuit according to the second embodiment.
Figure 11B:
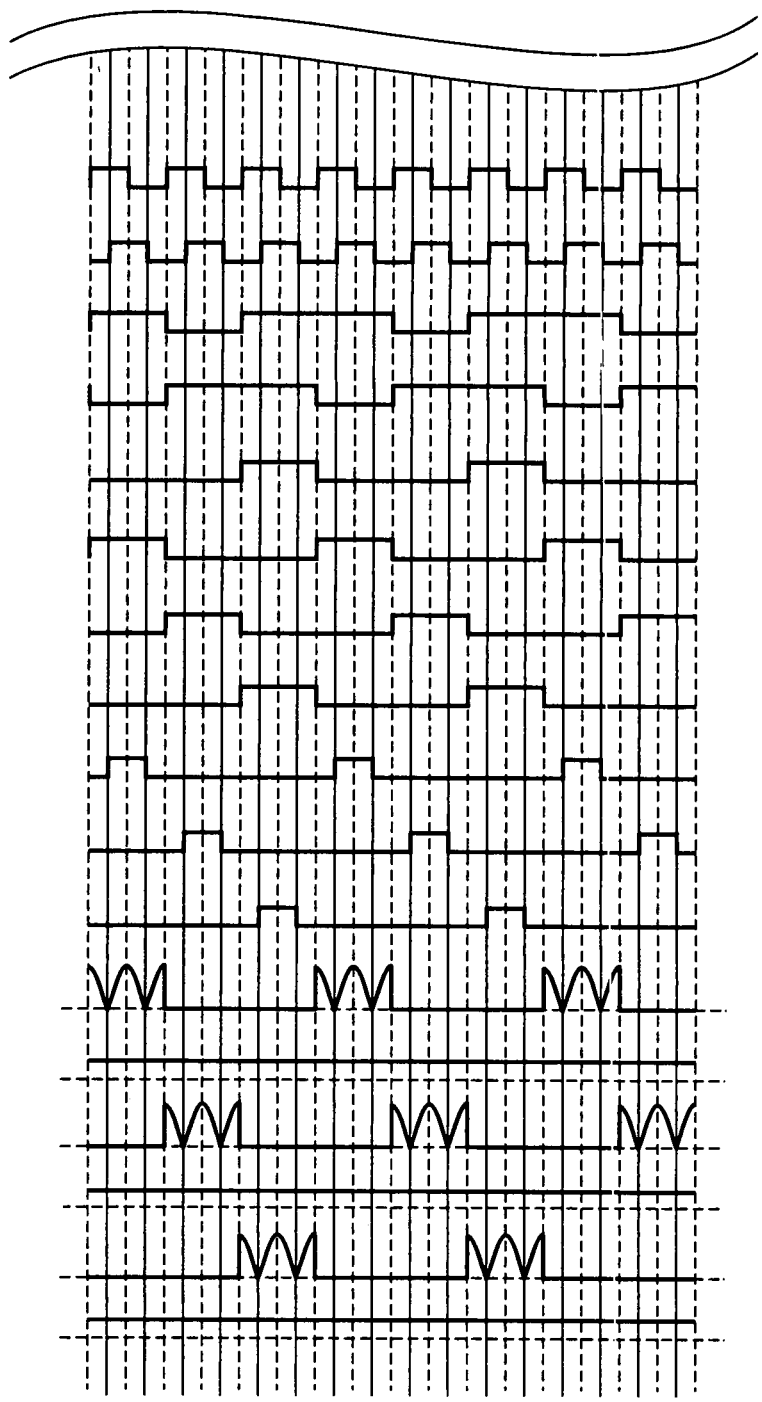

FIG. 11 is a time chart showing signal waveforms of respective portions of the C/V converting circuit 100 according to the second modified example.

According to the angular velocity sensor shown in the second modified example, as shown by FIG. 10, a time period in which the second terminal of the detecting circuit a241 becomes the connecting terminal (terminal conducted to the first terminal), the third terminal of the switching circuit b242 becomes the connecting terminal, the third terminal of the switching circuit c243 becomes the connecting terminal, and the third terminal of the switching circuit d244 becomes the connecting terminal, a time period in which the x-axis has the sensitivity, that is, the x-axis detecting mode is constituted.

In the x-axis detecting mode, there is brought about a connecting state (wire connecting state) in which the varying ends of the capacitor 1A and the capacitor 2A are connected, the carrier wave is applied from the connected varying ends, the varying ends of the capacitor 3A and the capacitor 4A are connected and the inverted carrier wave is applied from the connected varying ends.

The current signals indicating differences of the electrostatic capacitances of the capacitors connected in series are inputted from the common point of the three axes detecting circuit 307 to the current/voltage converting circuit 110, and the Vxout signal constituting the detecting signal of the angular velocity sensitivity of the x-axis is generated.

As shown by FIG. 10, a time period in which the third terminal of the switching circuit a241 becomes the connecting terminal, the second terminal of the switching circuit b242 becomes the connecting terminal, the third terminal of the switching circuit c243 becomes the connecting terminal, and the third terminal of the switching circuit d244 becomes the connecting terminal, becomes a time period in which the y-axis has sensitivity, that is, the y-axis detecting mode.

According to the y-axis detecting mode, there is brought about a connecting state in which the varying ends of the capacitor 1A and the capacitor 4A are connected, the carrier wave is applied from the connected varying ends, further, the varying ends of the capacitor 2A and the capacitor 3A are connected, and the inverted carrier wave is applied from the connected varying ends.

Current signals indicating differences of the electrostatic capacities of the capacitors connected in series are inputted from the common point of the three axes detecting circuit 307 to the current/voltage converting circuit 110, and the Vyout signal constituting the detecting signal of the angular velocity sensitivity of the y-axis is generated.

As shown by FIG. 10, a time period in which the second terminal of the switching circuit a241 becomes the connecting terminal, the second terminal of the switching circuit b242 becomes the connecting terminal, the second terminal of the switching circuit c243 becomes the connecting terminal, and the second terminal of the switching circuit d244 becomes the connecting terminal, becomes a time period in which the z-axis has a sensitivity, that is, the z-axis detecting mode.

According to the z-axis detecting mode, there is brought about a connecting state in which all of the varying ends of the capacitors 1A through 4A are connected, the carrier wave is applied from the connected varying ends, further, the inverted carrier wave is applied from the varying end of the capacitor Zr.

Current signals indicating differences of the electrostatic capacitances of the capacitors connected in series is inputted from the common point of the three axes detecting circuit 307 to the current/voltage converting circuit 110, and the Vzout signal constituting the detecting signal of the angular velocity sensitivity of the z-axis is generated.

According to the angular velocity sensor shown in the second modified example, as shown by FIG. 11, there is constructed a constitution in which the x-axis detecting mode (time period TX in which the x-axis has the sensitivity), the y-axis detecting mode (time period TY in which the y-axis has the sensitivity), and the z-axis detecting mode (time period TZ in which the z-axis has the sensitivity) emerge in this order.

In the synchronous detection circuits 112 through 114, by carrying out the time division processing based on switching timings of the carrier wave, that is, switching timings of the respective detecting modes, the x-axis detecting signal component (Vdx), the y-axis detecting signal component (Vdy), the z-axis detecting signal component (Vdz) are separated (extracted).

According to the angular velocity sensor shown in the second modified example, there is executed a control processing of the drive signal for applying the alternating current voltage to the capacitor ZB by a feedback control using the change in the attitude in the z-axis direction of the mass 13, that is, a result of detection based on the changes in the electrostatic capacitances of the capacitors 1A through 4A.

As described above, according to the angular velocity sensor shown in the second modified example, not only three axes detection of a dynamic amount can easily be carried out but also by carrying out three axes detection by the fixed electrodes 221 through 224 using the time division processing, the sensitivity in the x-axis detection, the sensitivity in the y-axis detection, and the sensitivity in the z-axis detection can substantially be made to be equal.

According to the angular velocity sensor shown in the second modified example, the electrode exclusively for the z-axis detection is not used, and therefore, not only a number of the electrodes can be reduced but also a number of wirings between the sensor (electrode) and the control circuit IC can be reduced. Further, since the electrode exclusive for the z-axis detection is not used, by that amount, a region of forming the fixed electrodes 221 through 224 can widely be ensured, and the sensitivity of the sensor can be promoted.

THIRD MODIFIED EXAMPLE

Next, a third modified example of the above-described angular velocity sensor will be explained.

Also in the angular velocity sensor shown in the third modified example, there is constructed an electrode constitution similar to that of the second modified example, in details, as shown by FIG. 8, the fixed electrodes 221 through 224 and the drive electrode 230 are provided.

According to the third modified example, an explanation will be given of the angular velocity sensor using the drive electrode 230 for vibrating the mass 13 shown in FIG. 8 is used also for the electrode for detecting the change in the attitude of the mass 13 in the z-axis direction (z-axis detection) and detecting the displacements in three axes directions of the mass 13.

Figure 12A:
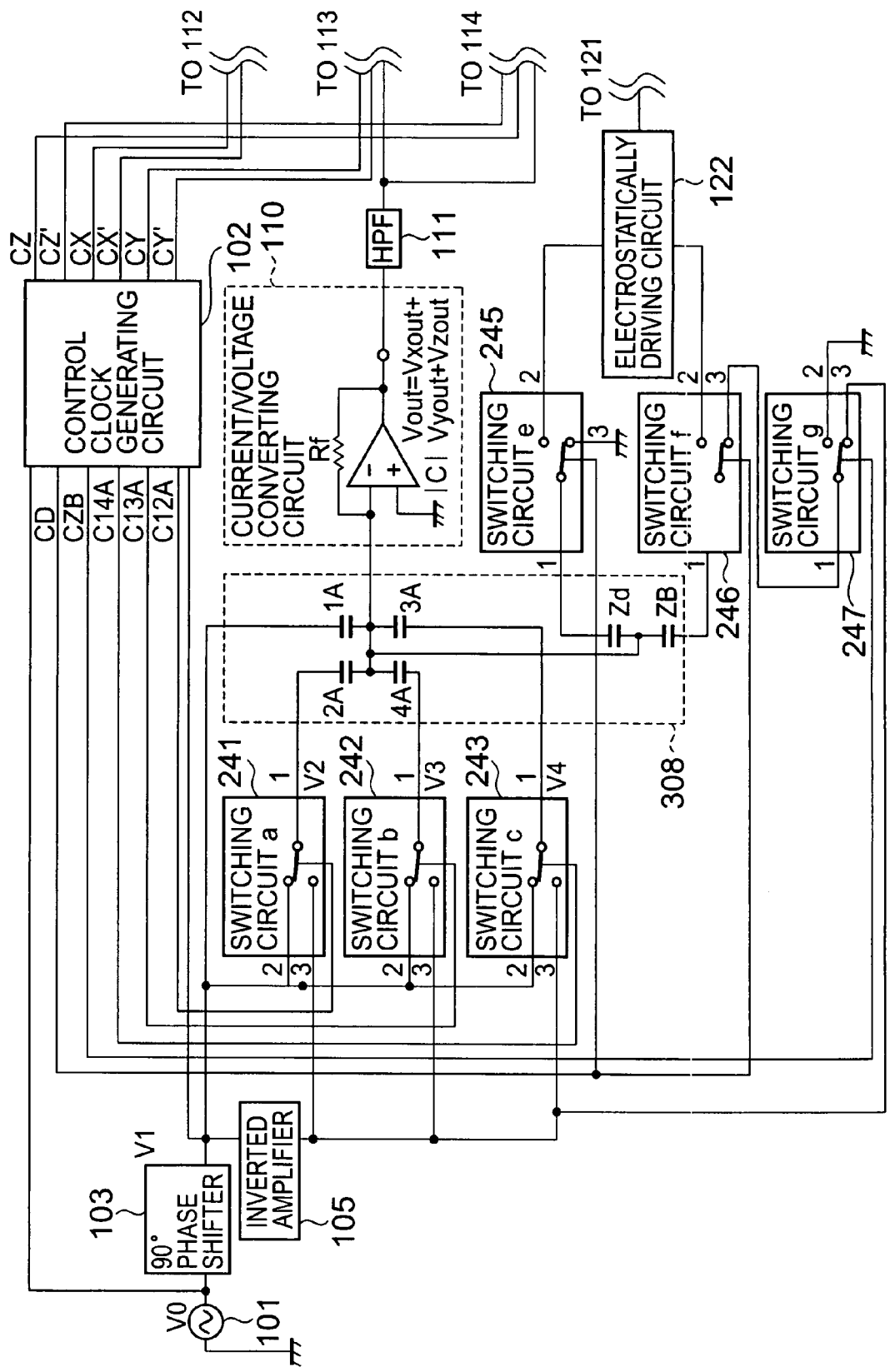
FIG. 12 is a circuit block diagram showing a C/V converting circuit in an angular velocity sensor shown in a third modified example.

FIG. 12 is a circuit block diagram showing the C/V converting circuit 100 in the angular velocity sensor shown in the third modified example.

Portions the same as those of the constitution of the above-described angular velocity sensor are attached with the same notations, a detailed explanation thereof will be omitted, and portions which differ from those of the above-described angular velocity sensor will be explained.

The angular velocity sensor shown in the third modified example is provided with a three axes detecting circuit 308 also having (serving also as) the functions of the x-axis detecting circuit, the y-axis detecting circuit and the z-axis detecting circuit.

The angular velocity sensor shown in the third modified example is provided with 6 of changeover switches for switching the connecting states of the three axes detecting circuit 308, the switching circuit a241, the switching circuit b242, the switching circuit c243, a switching circuit e245, a switching circuit f246, and a switching circuit g247.

The three axes detecting circuit 308 is constituted by the capacitors 1A through 4A, the capacitors ZB, Zd, one ends of which are connected to the same point (input point of current/voltage converting circuit) 110.

Here, the point previously connected (fixed) with the one ends of the capacitors 1A through 4A, ZB, Zd are made to constitute a common point, further, connecting points on other end side of the respective capacitors 1A through 4A, ZB, Zd are made to constitute varying ends.

The switching circuit a241, the switching circuit b242, the switching circuit c243, the switching circuit e245, the switching circuit f246, the switching circuit g247 each is a three terminal type switch constituting a fixed end by a first terminal and constituting switching ends by a second terminal and a third terminal.

Connecting constitutions of the connecting circuit a241, the switching circuit b242, and the switching circuit c243 are similar to those of the second modified example, and therefore, an explanation thereof will be omitted.

According to the switching circuit e245, the first terminal is connected to the varying end of the capacitor Zd, the second terminal is connected to one end of the electrostatically driving circuit 122, the third terminal is connected to a ground terminal.

According to the connecting circuit f246, the first terminal is connected to the varying end of the capacitor ZB (the drive electrode 230), the second terminal is connected to one end of the electrostatically driving circuit 122, and the third terminal is connected to the first terminal of the switching circuit g247.

According to the switching circuit g247, the first terminal is connected to the third terminal of the switching circuit f246, the second terminal is connected to the ground terminal, and the third terminal is connected to the output end of the inverted carrier wave.

According to the angular velocity sensor shown in the third modified example, the connecting points of the switching circuit a241, the switching circuit b242, the switching circuit c243, the switching circuit e245, the switching circuit f246, the switching circuit g247 are switched based on predetermined switching signals C12A, C13A, C14A, CZB, CD generated by the control clock generating-circuit 102.

Thereby, connecting states of the three axes detecting circuit 308, that is, connecting states of the capacitors 1A through 4A, Zd, ZB are switched.

Also in the angular velocity sensor shown in the third modified example, similar to the angular velocity sensor shown in the second modified example, by switching the connecting states (wire connecting states) of the three axes detecting circuit 308, switching to the x-axis detecting mode, the y-axis detecting mode, the z-axis detecting mode can be carried out.

According tot the angular velocity sensor shown in the third modified example, the capacitor ZB (capacitor for driving) is constituted such that during the time period of the z-axis detecting mode, the capacitor ZB is separated from the circuit of driving the mass 13, that is, the electrostatically driving circuit 122 and is made to function as a capacitor for detecting a change in the attitude in the z-axis direction of the mass 13.

In this way, according to the angular velocity sensor shown in the third modified example, the capacitor ZB is made to function as a capacitor for reference, and detects the change in the attitude in the z-axis direction of the mass 13.

Therefore, the electrostatic capacitance of the capacitor ZB in an initial state (a state in which a change in the attitude of the mass 13 is not brought about) is constituted to be equal to a total sum of the capacitors 1A through 4A).

Next, a detailed explanation will be given of a method of switching the detecting mode in the angular velocity sensor shown in the third modified example.

FIG. 13 is a table showing a relationship between the connecting state of the switching circuit and the constituted detecting mode of the three axes detecting circuit 308 in the angular velocity sensor shown in the third modified example.

According to the angular velocity sensor shown in the third modified example, as shown by FIG. 13, a time period in which the second terminal of the switching circuit a241 becomes the connecting terminal (terminal conducted to the first terminal), the third terminal of the switching circuit b242 becomes the connecting terminal, the third terminal of the switching circuit c243 becomes the connecting terminal, the second terminal of the switching circuit e245 becomes the connecting terminal, the second terminal of the switching circuit f246 becomes the connecting terminal, and the second terminal of the switching circuit g247 becomes the connecting terminal constitutes the x-axis detecting mode.

In the x-axis detecting mode, the varying ends of the capacitor 1A and the capacitor 2A are connected and a carrier wave is applied from the connected varying ends. Further, there is brought about a connecting state (wire connecting state) in which the varying ends of the capacitor 3A and the capacitor 4A are connected, and the inverted carrier wave is applied from the connected varying ends.

Current signals indicating differences of the electrostatic capacitances of the capacitors connected in series are inputted from the common point of the three axes detecting circuit 308 to the current/voltage converting circuit 110, and the Vxout signal constituting the detecting signal of the angular velocity sensitivity of the x-axis is generated.

In the x-axis detecting mode, the second terminal e245 becomes the connecting terminal, the second terminal of the switching circuit f246 becomes the connecting terminal, thereby, the capacitor Zd and the capacitor ZB are connected to the electrostatic driving circuit 122 to drive to vibrate the mass 13.

As shown by FIG. 13, a time period which the third terminal of the switching circuit a241 becomes the connecting terminal, the second terminal of the switching circuit b242 becomes the connecting terminal, the third terminal of the switching circuit c243 becomes the connecting terminal, the second terminal of the switching circuit e245 becomes the connecting terminal, the second terminal of the switching circuit f246 becomes the connecting terminal, and the second terminal of the switching circuit g247 becomes the connecting terminal constitutes the y-axis detecting mode.

In the y-axis detecting mode, there is brought about a connecting state in which the varying ends of the capacitors 1A and the capacitor 4A are connected, the carrier wave is applied from the connected varying ends, further, the varying ends of the capacitor 2A and the capacitor 3A are connected, and the inverted carrier wave is applied from the connected varying ends.

Current signals indicating differences of the electrostatic capacitances of the capacitors connected in series are inputted from the common point of the three axes detecting circuit 308 to the current/voltage converting circuit 110, and the Vyout signal constituting the detecting signal of the angular velocity sensitivity of the y-axis is generated.

In the y-axis detecting mode, similar to the x-axis detecting mode, the capacitor Zd and the capacitor ZB are connected to the electrostatically driving circuit 122 to drive to vibrate the mass 13.

As shown by FIG. 13, a time period in which the second terminal of the switching circuit a241 becomes the connecting terminal, the second terminal of the switching circuit b242 becomes the connecting terminal, the second terminal of the switching circuit c243 becomes the connecting terminal, the third terminal of the switching circuit e245 becomes the connecting terminal, the third terminal of the switching circuit f246 becomes the connecting terminal, and the third terminal of the switching circuit g247 becomes the connecting terminal constitutes the z-axis detecting mode.

In the z-axis detecting mode, there is brought about a connecting state in which the varying ends of the capacitors 1A through 4A are connected, the carrier wave is applied from the connected varying ends, further, the inverted carrier wave is applied from the varying end of the capacitor ZE.

Current signals indicating differences of the electrostatic capacitances of the capacitors connected in series are inputted from the common point of the three axes detecting circuit 308 to the current/voltage converting circuit 110, and the Vzout signal constituting the detecting signal of the angular velocity sensitivity of the z-axis is generated.

In the z-axis detecting mode, the third terminal of the switching circuit e245 becomes the connecting terminal, the third terminal of the switching circuit f246 becomes the connecting terminal, thereby, the capacitor Zd and the capacitor ZB are separated from the electrostatically driving circuit 122, and therefore, the mass 13 is not driven to vibrate.

Also in the angular velocity sensor showing the third modified example, similar to the angular velocity sensor shown in the second modified example, there is constructed a constitution in which the x-axis detecting mode (time period TX in which the x-axis has the sensitivity), the y-axis detecting mode (time period TY in which the y-axis has the sensitivity), the z-axis detecting mode (time period TZ in which the z-axis has the sensitivity) emerge in this order.

In the synchronous detection circuit 112 through 114, by carrying out the time division processing based on the timing of switching the carrier wave, that is, the timing of switching the respective detecting modes, the x-axis detecting signal component (Vdx), the y-axis detecting signal component (Vdy), the z-axis detecting signal component (Vdz) are separated (extracted).

According to the angular velocity sensor shown in the third modified example, only in the x-axis detecting mode and the y-axis detecting mode, a processing of controlling the drive signal for applying an alternating current voltage to the capacitor ZB is carried out by a feedback control using the change in the attitude in the z-axis direction of the mass 13, that is, a result of detection based on the changes in the electrostatic capacitances of the capacitors 1A through 4A.

As described above, according to the angular velocity sensor shown in the third modified example, by separating the capacitor ZB from the circuit of driving the mass 13 in the z-axis detecting mode, the capacitor ZB can be made to function as a capacitance for reference used in detecting in the z-axis direction of the mass 13. Therefore, the change in the attitude in the z-axis direction of the mass 13 can be detected without using the capacitor Zr provided in the angular velocity sensors of the above-described embodiment and the first and the second modified examples.

In the angular velocity sensors of the above-described embodiment and the first and the second modified examples, it is necessary to match the capacitance of the capacitor Zr with a total sum of the capacitances of the capacitors 1A through 4A with high accuracy. However, according to the angular velocity sensor shown in the third modified example, by dispensing with the capacitor Zr, an offset by a failure in adjusting the capacitor Zr can be avoided from being brought about.

According to the angular velocity sensor shown in the third modified example, the capacitors 1A through 4A and the capacitor ZB contribute to the z-axis detection of the mass 13. That is, in the z-axis detecting mode, the fixed electrodes 221 through 224 and the drive electrode 230, that is, the electrodes twice as much as those in the x-axis detecting mode or the y-axis detecting mode contribute thereto, and therefore, the detection sensitivity in the z-axis detecting mode can be made to be twice as much as the detection sensitivity in the x-axis detecting mode or the y-axis detecting mode.

FOURTH MODIFIED EXAMPLE

Next, a fourth modified example of the above-described angular velocity sensor will be explained.

Also in the angular velocity sensor shown in the fourth modified example, the electrode constitution shown in FIG. 8 is provided similar to the second and the third modified examples.

According to the fourth modified example, an explanation will be given of the angular velocity sensor for using the drive electrode 230 for vibrating the mass 13 also as the electrode for detecting the change in the attitude of the mass 13 in the z-axis direction (z-axis detection) and detecting the displacements in three axes directions of the mass 13 by utilizing the time division system by a constitution which differs from that of the third modified example.

Figure 14A:
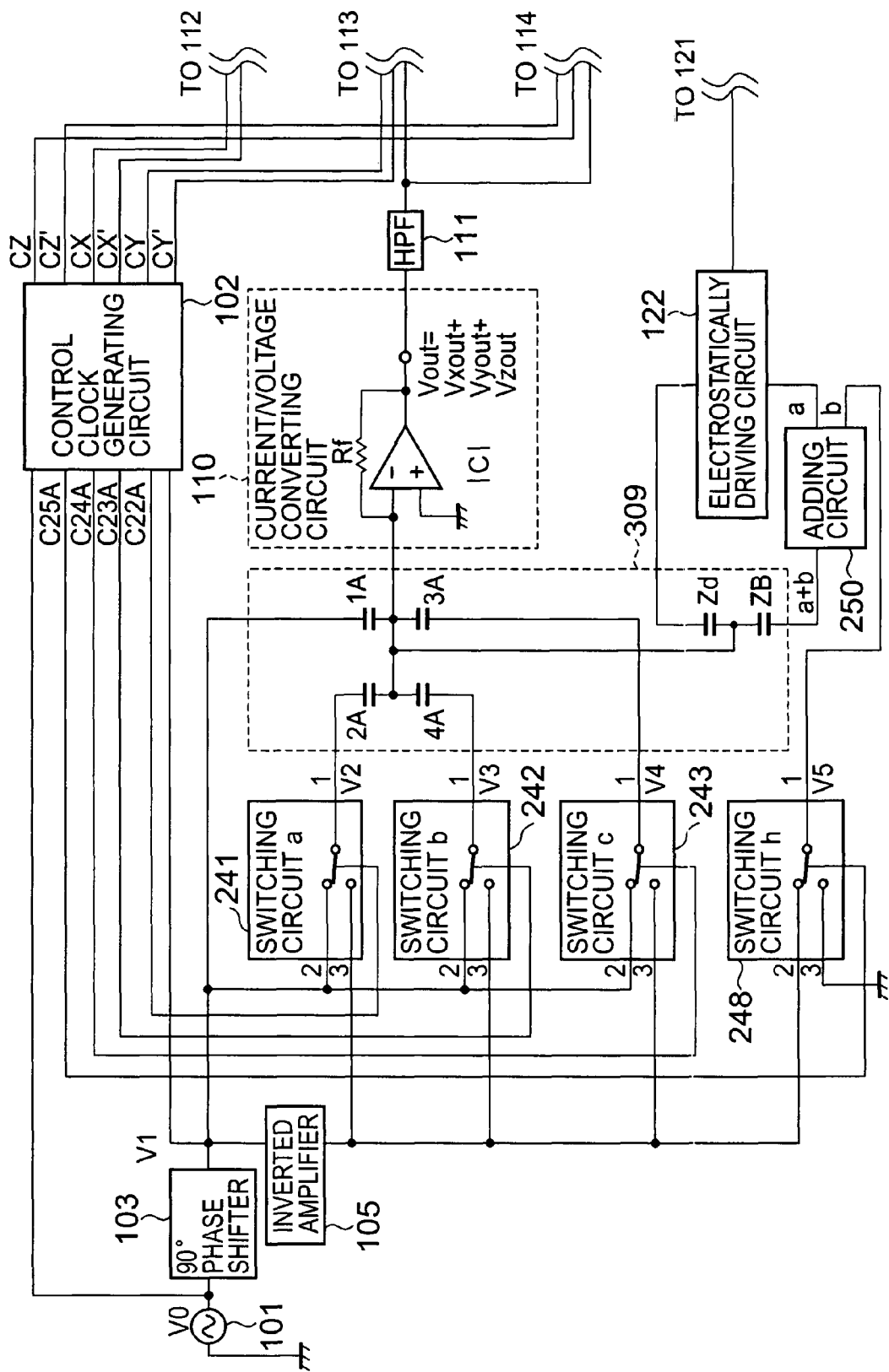
FIG. 14 is a circuit block diagram showing a C/V converting circuit in an angular velocity sensor shown in a fourth modified example.
Figure 14B:
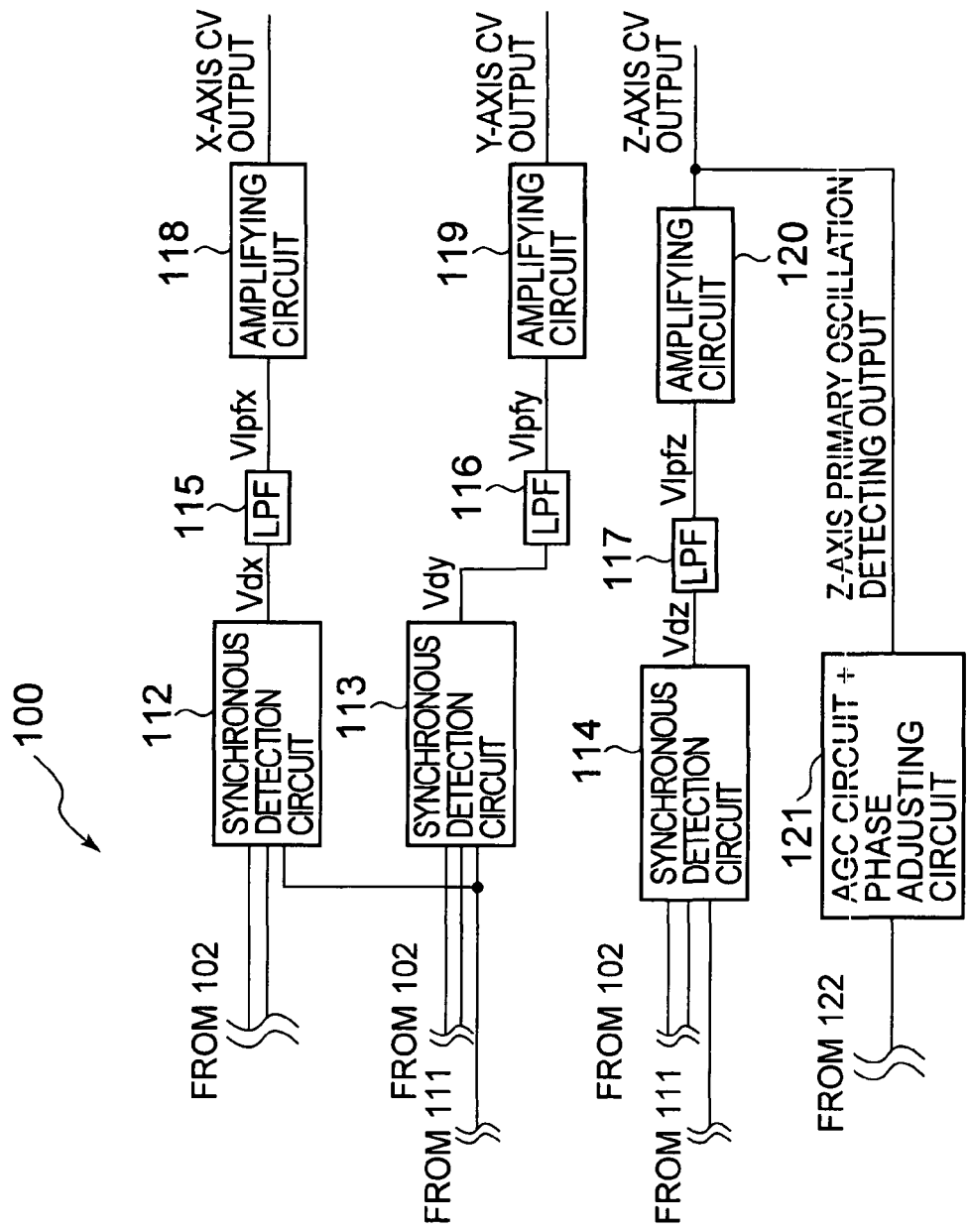

FIG. 14 is a circuit block diagram showing the C/V converting circuit 100 in the angular velocity sensor shown in the fourth modified example.

Portions the same as those of the constitution of the above-described angular velocity sensor are attached with the same notations, a detailed explanation thereof will be omitted, and portions which differ from those of the above-described angular velocity sensor will be explained.

The angular velocity sensor shown in the third modified example is provided with a three axes detecting circuit 309 having also (serving also as) the functions of the x-axis detecting circuit, the y-axis detecting circuit and the z-axis detecting circuit, further, four changeover switches for switching wire connecting states of the three axes detecting circuit 309, the switching circuit a241, the switching circuit b242, the switching circuit c243, and a switching circuit h248.

The angular velocity sensor shown in the fourth modified example is provided with an adding circuit 250 for superposing a carrier signal b (inverted carrier wave) onto a drive signal a outputted from the electrostatically driving circuit 122.

The three axes detecting circuit 309 is constituted by the capacitors 1A through 4A, the capacitor ZB, Zd one ends of which are connected to the same point (input point of current/voltage converting circuit 110).

Here, a point previously connected (fixed) with the one ends of the capacitors 1A through 4A, ZB, Zd is made to constitute a common point, further, connecting points on other end sides of the respective capacitors 1A through 4A, ZB, Zd are made to constitute varying ends.

The varying end of the capacitor Zd is connected to the electrostatically driving circuit 122, and the varying end of the capacitor ZB is connected to the adding circuit 250.

The switching circuit a241, the switching circuit b242, the switching circuit c243, the switching circuit h248 each is a three terminal type switch constituting a fixed end by a first terminal and constituting switching ends by a second terminal and a third terminal.

Connecting constitutions of the switching circuit a241, the switching circuit b242 and the switching circuit c243 are similar to those of the second modified example and the third modified example, and therefore, an explanation thereof will be omitted.

According to the switching circuit h248, the first terminal is connected to the adding circuit 250, the second terminal is connected to the output end of the inverted carrier wave, and the third terminal is connected to a ground terminal.

According to the angular velocity sensor shown in the fourth modified example, connecting points of the switching circuit a241, the switching circuit b242, the switching circuit c243, the switching circuit h248 are switched based on predetermined switching signals C22A, C23A, C24A, C25A generated by the control clock generating circuit 102.

Thereby, the connecting states of the three axes detecting circuit 309, that is, the connecting states of the capacitors 1A through 4A, Zd, ZB are switched.

Also in the angular velocity sensor shown in the fourth modified example, similar to the angular velocity sensors shown in the second modified example, the third modified example, by switching the connecting state (wire connecting state) in the three axes detecting circuit 309, switching to the x-axis detecting mode, the y-axis detecting mode, the z-axis detecting mode can be carried out.

According to the angular velocity sensor shown in the fourth modified example, there is constructed a constitution in which by superposing the carrier signal b for detecting the change in the attitude of the mass 13 onto the drive signal a of the mass 13 by using the adding circuit 250, the capacitor ZB can be used also for the capacitor for detecting the change in the attitude of the mass 13 in the z-axis direction (z-axis detection) without separating from the electrostatically driving circuit 122.

Next, a detailed explanation will be given of a method of switching the detection modes in the angular velocity sensor shown in the fourth modified example.

FIG. 15 is a table showing a relationship between the connecting state of the switching circuit and the constituted detecting mode of the three axes detecting circuit 309 in the angular velocity sensor shown in the fourth modified example.

In the angular velocity sensor shown in the fourth modified example, as shown by FIG. 15, a time period in which the second terminal of the switching circuit a241 becomes the connecting terminal, the third terminal of the switching circuit b242 becomes the connecting terminal, the third terminal of the switching circuit c243 becomes the connecting terminal, and the third terminal of the switching circuit h248 becomes the connecting terminal constitutes the x-axis detecting mode.

Also in the x-axis detecting mode in the fourth modified example, similar to those of the second and the third modified examples, current signals indicating differences of the electrostatic capacitances of the capacitors connected in series are inputted from the common point of the three axis detecting circuit 309 to the current/voltage converting circuit 110, and the Vxout signal constituting the detecting signal of the angular velocity sensitivity of the x-axis is generated.

A time period in which the third terminal of the switching circuit a241 becomes the connecting terminal, the second terminal of the switching circuit b242 becomes the connecting terminal, the third terminal of the switching circuit c243 becomes the connecting terminal, and the third terminal of the switching circuit h248 becomes the connecting terminal constitutes the y-axis detecting mode.

A time period in which the second terminal of the switching circuit a241 becomes the connecting terminal, the second terminal of the switching circuit b242 becomes the connecting terminal, the second terminal of the switching circuit c243 becomes the connecting terminal, and the second terminal of the switching circuit h248 becomes the connecting terminal constitutes the z-axis detecting mode.

According to the z-axis detecting mode in the fourth modified example, by constituting the connecting terminal by the second terminal of the switching circuit h248, the carrier signal b is applied to the adding circuit 250. Further, in the adding circuit 250, the carrier signal b is added (superposed) to the drive signal a of the mass 13.

Therefore, according to the angular velocity sensor shown in the fourth modified example, in all of the detecting modes, the mass 13 can be driven to vibrate simultaneously.

Also in the angular velocity sensor shown in the fourth modified example, similar to the angular velocity sensors shown in the second and the third modified examples, there is constructed a constitution in which the x-axis detecting mode (time period TX in which the x-axis has the sensitivity), the y-axis detecting mode (time period TY in which the y-axis has the sensitivity), the z-axis detecting mode (time period TZ in which the z-axis has the sensitivity) emerge in this order.

In the synchronous detection circuits 112 through 114, by carrying out the time division processing based on the timings of switching the carrier wave, that is, the timing of switching the respective detecting modes, the x-axis detecting signal component (Vdx), the y-axis detecting signal component (Vdy), the z-axis detecting signal component (Vdz) are separated (extracted).

At HPF 111, a band pass band is set such that a frequency component of the drive signal a is sufficiently hampered.

As described above, according to the angular velocity sensor shown in the fourth modified example, by providing the adding circuit 250 for superposing the carrier signal b onto the drive signal a, in the z-axis detecting mode, the capacitor ZB for driving can be made to function as the capacitance for reference used in detecting in the z-axis direction of the mass 13. Therefore, the change in the attitude in the z-axis direction of the mass 13 can be detected similar to the third modified example without using the capacitors Zr provided at the angular velocity sensors of the embodiment and the first and the second modified examples.

FIFTH MODIFIED EXAMPLE

Next, a fifth modified example of the above-described embodiment will be explained.

In an angular velocity sensor shown in the fifth modified example, in order to further restrain crosstalk (interference with cross axis) from being brought about, there is provided a time division non-detecting time period in which signals of the Vxout signal and the Vyout signal provided by using the time division system are not detected (extracted).

The time division processing explained in the above-described embodiment (FIG. 5) is constituted such that the Vyout signal is outputted during the time period in which the Vxout signal is made OFF and the Vxout signal is outputted during the time period in which the Vyout signal is made OFF.

FIG. 16 is a diagram showing an example of a signal waveform which is depressed.

However, when a responsible band of the current/voltage converting circuit 110 is not sufficient, for example, when a limit of a high band is restricted to be low, as shown by a broken line of FIG. 16, there is a concern that the signal waveform is depressed and a signal is generated during the OFF time period.

In details, when a signal is made ON and when a signal is made OFF, that is, when the Vxout signal or the Vyout signal rises and when the signal falls, a delay (phase delay) is brought about.

Such a transient depression of the signal waveform, that is, the transient phase delay significantly emerges when the two-axis detecting circuit 107 is switched at a timing at which the phase of the synchronous detection clock (carrier wave) is 90° or 270°.

FIG. 17 is a diagram showing an example of a crosstalk to a detecting signal of z-axis.

As shown by FIG. 17, when there is the phase delay of the Vxout signal or the Vyout signal, that is, when there is a phase delay of a CV output of cross axes (x and y axes), according to a synchronous detection output of its own axis (z-axis in this case), a portion of the phase delay becomes as shown by a broken line.

Then, as shown by FIG. 17, there is a crosstalk to the detecting signal of the z-axis as a component of an amount of delaying the phase (indicated by a in the drawing).

In the angular velocity sensor according to the embodiment, a drive signal for subjecting the mass 13 to resonance primary oscillation is generated in order to detect the Coriolis force based on the detecting signal of the z-axis detecting circuit 309 (z-axis signal), further, the detecting signal of the z-axis detecting circuit (z-axis signal) is used as the reference signal of the synchronous detection circuit 114.

Therefore, when the waveform depression of the Vxout signal or the Vyout signal constitutes the crosstalk to the detecting signal of the z-axis detecting circuit 109, an influence thereof constitutes noise (noise signal) as it is, and therefore, an accuracy of vibrating or a stability of the mass 13, further, a detection accuracy of the synchronous detection circuit 114 is deteriorated and an accuracy of detecting the angular velocity sensor is deteriorated.

Hence, in order to restrain the influence effected when the crosstalk to the z-axis detecting signal (z-axis output) in this way is brought about, a non-detecting time period (non-detecting section) of the z-axis detecting signal is provided in a time period in which interference with cross axes (x-axis, y-axis) is predicted, that is, a time period in which crosstalk is predicted to be brought about.

It is preferable to provide a non-detecting time period (non-detecting section) of a signal also at a timing of switching the Vxout signal and the Vyout signal such that the influence of the depression of the signal waveform as shown by FIG. 16 is not effected at an interval between the Vxout signal and the Vyout signal constituting the object of the time division processing.

Here, setting of a non-detecting time period will be explained.

When a non-detecting time period of a detecting signal is prolonged, a detection sensitivity of an axis constituting an object is deteriorated. Then, there is a possibility in which an S/N ratio (signal to noise ratio) of a detecting signal is deteriorated and a detection accuracy is deteriorated.

Therefore, it is preferable to set the non-detecting time period of the z-axis detecting signal to a necessary minimum length.

As described above, the depression of the waveforms of the Vxout signal and the Vyout signal constituting the output of the current/voltage converting circuit 110 is brought about by restricting the band on the high frequency side of the current/voltage converting circuit 110.

Here, a relationship between a high frequency side cutoff frequency fc of the current/voltage converting circuit 110 and a frequency fo of the carrier wave (V0 signal) is defined as follows.

$$fc = kfo \quad \text{(Equation 1)}$$

Notation k designates a proportional constant and is normally equal to or larger than 1.

In (Equation 1), the larger the proportional constant k, the smaller the degree of the depression of the waveform relatively.

For example, when a frequency characteristic in a high frequency band of the current/voltage converting circuit 110 is assumed to have an attenuating characteristic of a first order, the high frequency side cutoff frequency fc can be expressed as follows.

$$fc = 1/2\pi\tau \quad \text{(Equation 2)}$$

Notation τ designates a time constant.

Figure 18:
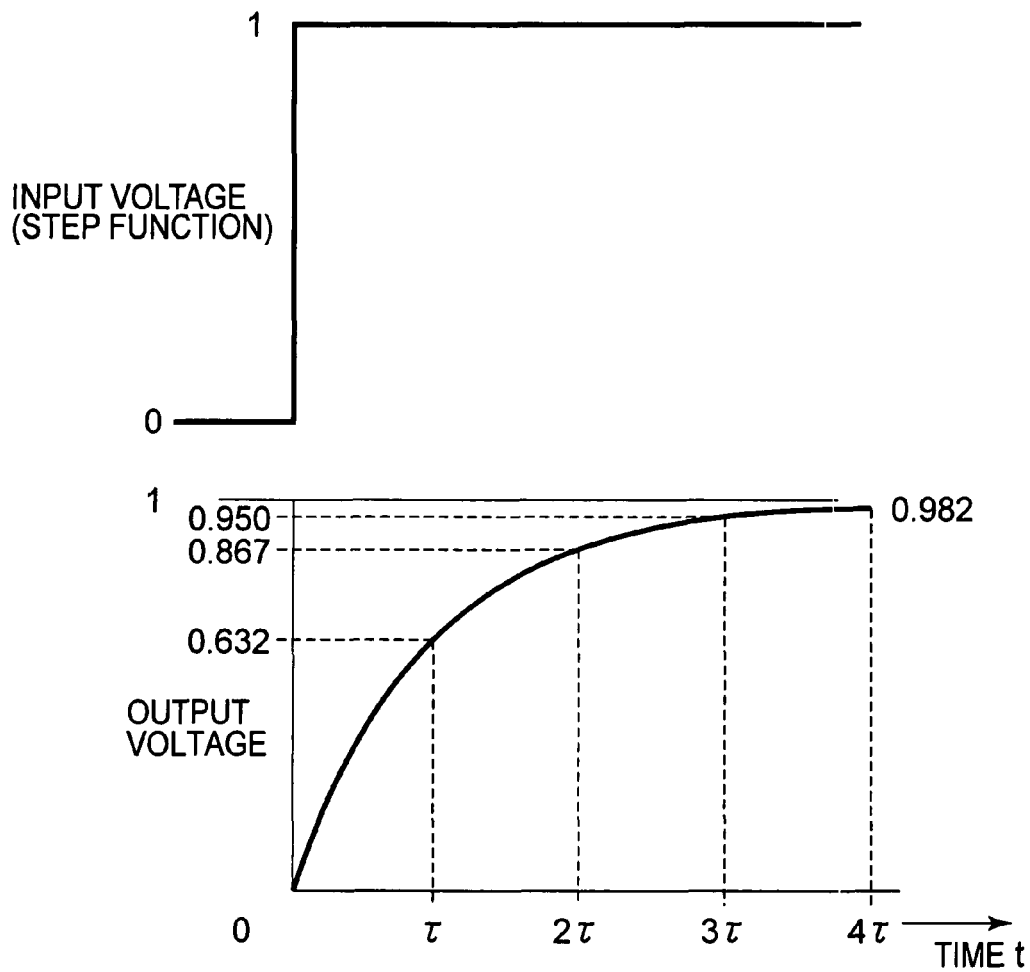
FIG. 18 is a diagram showing a step response characteristic in a current/voltage converting circuit.

FIG. 18 is a diagram showing a step response characteristic of the current/voltage converting circuit 110.

Further, in FIG. 18, an input voltage (step function) is shown at an upper stage and an output voltage (response waveform) is shown at a lower stage.

As shown by FIG. 18, it is known that at a time point of an elapse of 3τ after inputting the input voltage, the response rises by about 95% of the input voltage, and rises by about 98% of the input voltage at a time point of an elapse of 4τ.

That is, time (time period) from t=0 (input of input voltage) to t=4τ constitutes a time period of bringing about a depression of the waveform.

Figure 19:
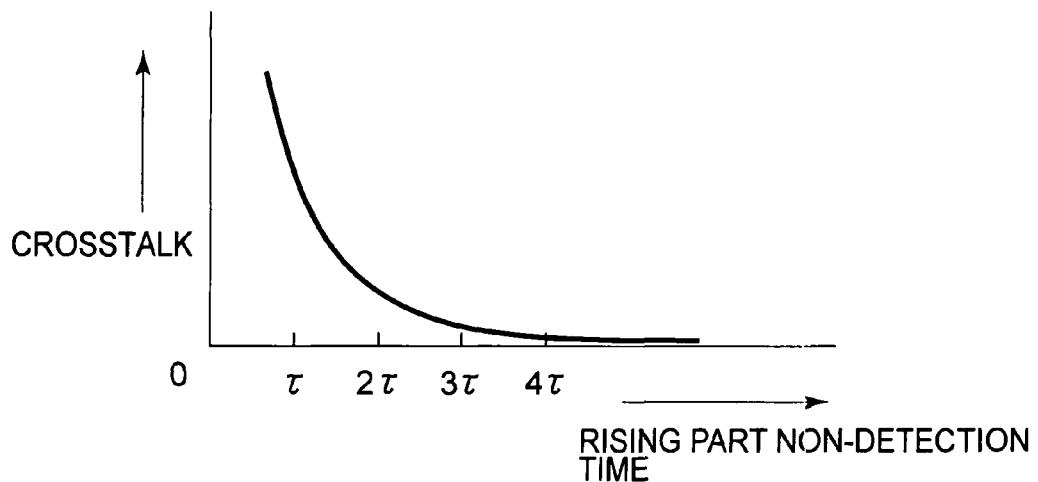
FIG. 19 is a diagram showing a relationship between a time period from starting to detect an x-axis signal (Vxout signal) or a y-axis signal (Vyout signal) until finishing a time period in which a z-axis detecting circuit is not detected and a crosstalk to the z-axis detecting signal.

FIG. 19 shows a diagram showing a relationship between a time period from when the x-axis signal (Vxout signal) or the y-axis signal (Vyout signal) is started to be detected until finishing the non-detecting time period of the z-axis detecting signal, and the crosstalk to the z-axis detecting signal.

Further, the crosstalk indicated in the ordinate indicates an amount of interference from cross axes (x-axis, y-axis) included in the z-axis detecting signal.

The time of finishing the non-detecting time period is set within a range of capable of satisfying the specification (allowable range of accuracy) of the sensor or the like based on the relationship diagram of FIG. 19.

For example, by setting the time of finishing the non-detecting time period of the z-axis detecting signal to a time point of an elapse of 3τ through 4τ from starting to detect the x-axis signal (Vxout signal) or the y-axis signal (Vyout signal), the crosstalk to the z-axis detecting signal can considerably be improved.

Here, when the time constant τ is expressed based on (Equation 1) and (Equation 2), the following relationship is established.

$$\tau = 1/2\pi fc = 1/2\pi k fo = To/2\pi k \quad \text{(Equation 3)}$$

Notation To designates a period of a carrier wave (V0 signal).

Then, 2τ, 3τ, 4τ can be expressed respectively by using To and k as follows.

$$2\tau = 2/2\pi k fo = 2To/2\pi k \quad \text{(Equation 4)}$$

$$3\tau = 3/2\pi k fo = 3To/2\pi k \quad \text{(Equation 5)}$$

$$4\tau = 4/2\pi k fo = 4To/2\pi k \quad \text{(Equation 6)}$$

As is known from (Equation 3) through (Equation 6), the larger the value of k, the shorter the non-detecting period.

In this way, according to the fifth modified example, by providing the non-detecting time period of the z-axis detecting signal, the influence on the z-axis detecting signal by the crosstalk from the x-axis detecting signal and the y-axis detecting signal can be restrained (reduced). Thereby, the amount of the noise in the electrostatically driving signal of the mass 13 can be reduced, and therefore, the detection accuracy of the angular velocity can further be promoted.

A technology of providing the non-detecting time period for reducing the influence of the crosstalk shown in the fifth modified example may be applied to the angular velocity sensors shown in the first through the fourth modified examples.

What is claimed is:

1. A dynamic amount sensor comprising:
a frame having a hollow portion;
a plurality of flexible beams connected to the frame;
a mass supported on the frame by way of the flexible beams, a surface portion of the mass functioning as a movable electrode and changing an attitude thereof corresponding to an external force;
a plurality of fixed electrodes arranged to face the mass in an opposed manner;
detecting means for detecting a change in an electrostatic capacitance of each of a plurality of electrostatic capacitance elements comprised of the movable electrode and a respective fixed electrode;
switching means for switching the detecting means to a first connecting state forming a first detecting circuit that detects a change in the electrostatic capacitance of the electrostatic capacitance elements in accordance with a change in an attitude of the surface portion of the mass in a first detecting axis direction, and for switching the detecting means to a second connecting state forming a second detecting circuit that detects a change in the electrostatic capacitance of the electrostatic capacitance elements in accordance with a change in an attitude of the surface portion of the mass in a second detecting axis direction; and
dynamic amount outputting means for outputting, in accordance with a detection result by the detecting means in the first and second connecting states, components of a dynamic amount acting on the surface portion of the mass in the first detecting axis direction and the second detecting axis direction;
wherein the first detecting circuit includes a circuit formed by connecting at least a first electrostatic capacitance element in series with at least a second electrostatic capacitance element, the first and second electrostatic capacitance elements changing electrostatic capacitances along with an inclination of the mass in the first detecting axis direction such that when the electrostatic capacitance of the first electrostatic capacitance element increases the electrostatic capacitance of the second electrostatic capacitance element decreases;
wherein the second detecting circuit includes a circuit formed by connecting at least a first electrostatic capacitance element in series with at least a second electrostatic capacitance element, the first and second electrostatic capacitance elements of the second detecting circuit changing electrostatic capacitances along with an inclination of the mass in the second detecting axis direction such that, for the second detecting circuit, when the electrostatic capacitance of the first electrostatic capacitance element increases the electrostatic capacitance of the second electrostatic capacitance element decreases; and
further comprising carrier wave applying means for applying carrier waves whose phases are inverted from each other by 180° to the respective first and second electrostatic capacitance elements which are connected in series in the first detecting circuit and the second detecting circuit.

2. A dynamic amount sensor according to claim 1; wherein the detecting means includes a third detecting circuit formed by connecting at least a first electrostatic capacitance element in series with at least a second electrostatic capacitance element, the first and second electrostatic capacitance elements of the third detecting circuit changing electrostatic capacitances along with a displacement of the mass in a third detecting axis direction thereof such that, for the third detecting circuit, when the electrostatic capacitance of the first electrostatic capacitance element increases the electrostatic capacitance of the second electrostatic capacitance element decreases; and wherein the carrier wave applying means applies the carrier waves to the respective first and second electrostatic capacitance elements which are connected in series in the third detecting circuit.

3. A dynamic amount sensor according to claim 1; wherein the dynamic amount outputting means separates detecting signals of the electrostatic capacitances of the respective first and second detecting circuits after a lapse of a predetermined time from a timing at which the switching means performs a switching operation.

4. A dynamic amount sensor according to claim 3; wherein the predetermined time is set to a value which falls within a range of 3 through $4\tau$ from the timing of the switching operation by the switching means, where $\tau$ is a time constant.

5. A dynamic amount sensor according to claim 1; wherein the switching means switches the detecting means to a third connecting state forming a third detecting circuit that detects a change in the electrostatic capacitance of the electrostatic capacitance elements in accordance with a change in an attitude of the surface portion of the mass in a third detecting axis direction; and wherein the dynamic amount outputting means outputs, in accordance with a detection result by the detecting means in the first, second, and third connecting states, components of a dynamic amount acting on the surface portion of the mass in the first detecting axis direction, the second detecting axis direction, and the third axis detecting direction.

6. A dynamic amount sensor according to claim 5; wherein the third detecting circuit includes a circuit formed by connecting at least a first electrostatic capacitance element in series with at least a second electrostatic capacitance element, the first and second electrostatic capacitance elements of the third detecting circuit changing electrostatic capacitances along with a displacement of the mass in the third detecting axis direction; and wherein the carrier wave applying means applies the carrier waves to the first and second electrostatic capacitance elements which are connected in series in the third detecting circuit.

7. A dynamic amount sensor according to 5; wherein the fixed electrodes include four first electrodes which, using a center position of mass as a reference position, are arranged equidistantly around the reference position on the same plane; wherein the circuit of the first detection circuit includes first and second circuit portions connected in series, the first circuit portion being formed by connecting in parallel one of the electrostatic capacitance elements comprised of the movable electrode and a first of the four first electrodes positioned in a first quadrant on an x-y plane with one of the electrostatic capacitance elements comprised of the movable electrode and a second of the four first electrodes positioned in a second quadrant on the x-y plane, the second circuit portion being formed by connecting in parallel one of the electrostatic capacitance elements comprised of the movable electrode and a third of the four first electrodes positioned in a fourth quadrant on the x-y plane with one of the electrostatic capacitance elements comprised of the movable electrode and a fourth of the four first electrodes positioned in a third quadrant on the x-y plane; wherein the circuit of the second detection circuit includes first and second circuit portions connected in series, the first circuit portion being formed by connecting in parallel the electrostatic capacitance element comprised of the movable electrode and the first of the four first electrodes positioned in the first quadrant on the x-y plane with the electrostatic capacitance element comprised of the movable electrode and the third of the four first electrodes positioned in the fourth quadrant on the x-y plane, the second circuit portion being formed by connecting in parallel the electrostatic capacitance element comprised of the movable electrode and the fourth of the four first electrodes positioned in the third quadrant on the x-y plane and the electrostatic capacitance element comprised of the movable electrode and the second of the four first electrodes positioned in the second quadrant on the x-y plane; and wherein the switching means switches the first detection circuit and the second detection circuit by switching wire connecting states of the electrostatic capacitance elements.

8. A dynamic amount sensor according to 7; wherein the fixed electrodes further include four second electrodes on a plane which face the four first electrodes in an opposed manner by way of the mass; wherein the circuit of the first detection circuit connects in parallel one of the electrostatic capacitance elements comprised of the movable electrode and a first of the four second electrodes positioned in the fourth quadrant on the x-y plane and one of the electrostatic capacitance elements comprised of the movable electrode and a second of the four second electrodes positioned in the third quadrant on the x-y plane with the electrostatic capacitance element comprised of the movable electrode and the first of the four first electrodes positioned in the first quadrant on the x-y plane, and connects in parallel one of the electrostatic capacitance elements comprised of the movable electrode and a third of the four second electrodes positioned in the first quadrant on the x-y plane and one of the electrostatic capacitance elements comprised of the movable electrode and a fourth of the four second electrodes positioned in the second quadrant on the x-y plane with the electrostatic capacitance element comprised of the movable electrode and the fourth of the first electrodes positioned in the third quadrant on the x-y plane; and wherein the circuit of the second detection circuit connects in parallel the electrostatic capacitance element comprised of the movable electrode and the third of the four second electrodes positioned in the first quadrant on the x-y plane and the electrostatic capacitance element comprised of the movable electrode and the first of the four second electrodes positioned in the fourth quadrant on the x-y plane with the electrostatic capacitance element comprised of the movable electrode and the fourth of the four first electrodes positioned in the third quadrant on the x-y plane, and connects in parallel the electrostatic capacitance element comprised of the movable electrode and the second of the four second electrodes positioned in the third quadrant on the x-y plane and the electrostatic capacitance element comprised of the movable electrode and the fourth of the four second electrodes positioned in the second quadrant on the x-y plane with the electrostatic capacitance element comprised of the movable electrode and the first of the four first electrodes positioned in the first quadrant on the x-y plane.

9. A dynamic amount sensor according to 7; wherein the fixed electrodes comprise a third electrode on a plane which face the first four electrodes in an opposed manner by way of the mass; and wherein the third detecting circuit includes a circuit formed by connecting in series the electrostatic capacitance element comprised of the movable electrode and one of the four first electrodes and the electrostatic capacitance element comprised of the movable electrode and the third electrode.

10. A dynamic amount sensor according to claim 5; further comprising an amplifying circuit to which output detection signals from the first detection circuit, the second detection circuit, and the third detection circuit are inputted; wherein the switching means switches the detecting means at each constant period based on timing of a control clock signal; and wherein in response to output signals from the amplifier circuit, the dynamic amount outputting means outputs the dynamic amount acting on the mass in the first, second and third detecting axes directions after separating the output detection signals from one another by performing time division processing in accordance with switching timing by the switching means.

11. A dynamic amount sensor according to claim 10; wherein the third detecting circuit includes a circuit formed by connecting at least a first electrostatic capacitance element in series with at least a second electrostatic capacitance element, the first and second electrostatic capacitance elements of the third detecting circuit changing electrostatic capacitances along with a displacement of the mass in the third detecting axis direction; and wherein the carrier wave applying means applies the carrier waves to the first and second electrostatic capacitance elements which are connected in series in the third detecting circuit.

12. A dynamic amount sensor according to claim 1; further comprising an amplifying circuit to which output detection signals from the first detection circuit and the second detection circuit are inputted; wherein the switching means switches the detecting means at each constant period based on timing of a control clock signal; and wherein in response to output signals from the amplifier circuit, the dynamic amount outputting means outputs the dynamic amount acting on the mass in the first and second detecting axes directions after separating the output detection signals from one another by performing time division processing in accordance with switching timing by the switching means.

13. A dynamic amount sensor according to claim 12; further comprising a third detecting circuit including a circuit formed by connecting at least a first electrostatic capacitance element in series with at least a second electrostatic capacitance element, the first and second electrostatic capacitance elements of the third detecting circuit changing electrostatic capacitances along with an inclination of the mass in a third detecting axis direction such that, for the third detecting circuit, when the electrostatic capacitance of the first electrostatic capacitance element increases the electrostatic capacitance of the second electrostatic capacitance element decreases; and wherein the carrier wave applying means applies the carrier waves to the first and second electrostatic capacitance elements which are connected in series in the third detecting circuit.

14. A dynamic amount sensor according to claim 12; wherein the dynamic amount outputting means separates detecting signals of the electrostatic capacitances of the respective first and second detecting circuits after a lapse of a predetermined time from a timing at which the switching means performs a switching operation.

15. A dynamic amount sensor according to claim 14; wherein the predetermined time is set to a value which falls within a range of 3 through 4τ from the timing of the switching operation by the switching means, where τ is a time constant.

16. A dynamic amount sensor comprising:
a frame having a hollow portion;
a plurality of flexible beams connected to the frame;
a mass supported on the frame by way of the flexible beams, a surface portion of the mass functioning as a movable electrode and changing an attitude thereof corresponding to an external force;
a plurality of fixed electrodes arranged to face the mass in an opposed manner;
detecting means for detecting a change in an electrostatic capacitance of each of a plurality of electrostatic capacitance elements comprised of the movable electrode and a respective fixed electrode;
switching means for switching the detecting means to a first connecting state forming a first detecting circuit that detects a change in the electrostatic capacitance of the electrostatic capacitance elements in accordance with a change in an attitude of the surface portion of the mass in a first detecting axis direction, and for switching the detecting means to a second connecting state forming a second detecting circuit that detects a change in the electrostatic capacitance of the electrostatic capacitance elements in accordance with a change in an attitude of the surface portion of the mass in a second detecting axis direction; and
dynamic amount outputting means for outputting, in accordance with a detection result by the detecting means in the first and second connecting states, components of a dynamic amount acting on the surface portion of the mass in the first detecting axis direction and the second detecting axis direction;
wherein the fixed electrodes include four first electrodes which, using a center position of mass as a reference position, are arranged equidistantly around the reference position on the same plane;
wherein the circuit of the first detection circuit includes first and second circuit portions connected in series, the first circuit portion being formed by connecting in parallel one of the electrostatic capacitance elements comprised of the movable electrode and a first of the four first electrodes positioned in a first quadrant on an x-y plane with one of the electrostatic capacitance elements comprised of the movable electrode and a second of the four first electrodes positioned in a second quadrant on the x-y plane, the second circuit portion being formed by connecting in parallel one of the electrostatic capacitance elements comprised of the movable electrode and a third of the four first electrodes positioned in a fourth quadrant on the x-y plane with one of the electrostatic capacitance elements comprised of the movable electrode and a fourth of the four first electrodes positioned in a third quadrant on the x-y plane;
wherein the circuit of the second detection circuit includes first and second circuit portions connected in series, the first circuit portion being formed by connecting in parallel the electrostatic capacitance element comprised of the movable electrode and the first of the four first electrodes positioned in the first quadrant on the x-y plane with the electrostatic capacitance element comprised of the movable electrode and the third of the four first electrodes positioned in the fourth quadrant on the x-y plane, the second circuit portion being formed by connecting in parallel the electrostatic capacitance element comprised of the movable electrode and the fourth of the four first electrodes positioned in the third quadrant on the x-y plane and the electrostatic capacitance element comprised of the movable electrode and the second of the four first electrodes positioned in the second quadrant on the x-y plane; and
wherein the switching means switches the first detection circuit and the second detection circuit by switching wire connecting states of the electrostatic capacitance elements.

17. A dynamic amount sensor according to 16; wherein the fixed electrodes further include four second electrodes on a plane which face the four first electrodes in an opposed manner by way of the mass; wherein the circuit of the first detection circuit connects in parallel one of the electrostatic capacitance elements comprised of the movable electrode and a first of the four second electrodes positioned in the fourth quadrant on the x-y plane and one of the electrostatic capacitance elements comprised of the movable electrode and a second of the four second electrodes positioned in the third quadrant on the x-y plane with the electrostatic capacitance element comprised of the movable electrode and the first of the four first electrodes positioned in the first quadrant on the x-y plane, and connects in parallel one of the electrostatic capacitance elements comprised of the movable electrode and a third of the four second electrodes positioned in the first quadrant on the x-y plane and one of the electrostatic capacitance elements comprised of the movable electrode and a fourth of the four second electrodes positioned in the second quadrant on the x-y plane with the electrostatic capacitance element comprised of the movable electrode and the fourth of the first electrodes positioned in the third quadrant on the x-y plane; and wherein the circuit of the second detection circuit connects in parallel the electrostatic capacitance element comprised of the movable electrode and the third of the four second electrodes positioned in the first quadrant on the x-y plane and the electrostatic capacitance element comprised of the movable electrode and the first of the four second electrodes positioned in the fourth quadrant on the x-y plane with the electrostatic capacitance element comprised of the movable electrode and the fourth of the four first electrodes positioned in the third quadrant on the x-y plane, and connects in parallel the electrostatic capacitance element comprised of the movable electrode and the second of the four second electrodes positioned in the third quadrant on the x-y plane and the electrostatic capacitance element comprised of the movable electrode and the fourth of the four second electrodes positioned in the second quadrant on the x-y plane with the electrostatic capacitance element comprised of the movable electrode and the first of the four first electrodes positioned in the first quadrant on the x-y plane.

18. A dynamic amount sensor according to 16; wherein the fixed electrodes comprise a third electrode on a plane which face the first four electrodes in an opposed manner by way of the mass; and wherein the third detecting circuit includes a circuit formed by connecting in series the electrostatic capacitance element comprised of the movable electrode and one of the four first electrodes and the electrostatic capacitance element comprised of the movable electrode and the third electrode.

* * * * *